United States Patent
Wang et al.

(10) Patent No.: US 11,064,411 B2
(45) Date of Patent: Jul. 13, 2021

(54) LOAD BALANCING IN WIRELESS NETWORKS TO ENHANCE USER EXPERIENCE

(71) Applicant: AT&T INTELLECTUAL PROPERTY I, L.P., Atlanta, GA (US)

(72) Inventors: Huahui Wang, Bridgewater, NJ (US); Gopalakrishnan Meempat, East Brunswick, NJ (US); Ravi Raina, Skillman, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 30 days.

(21) Appl. No.: 16/004,133

(22) Filed: Jun. 8, 2018

(65) Prior Publication Data
US 2019/0380076 A1 Dec. 12, 2019

(51) Int. Cl.
*H04W 36/08* (2009.01)
*H04W 24/08* (2009.01)
(Continued)

(52) U.S. Cl.
CPC .......... *H04W 36/08* (2013.01); *H04B 17/336* (2015.01); *H04W 24/08* (2013.01); *H04W 76/10* (2018.02)

(58) Field of Classification Search
CPC ..... H04W 36/08; H04W 76/10; H04W 24/08; H04B 17/336
See application file for complete search history.

(56) References Cited

U.S. PATENT DOCUMENTS

| 8,179,866 B2 | 5/2012 | Carlsson |
| 8,423,026 B2 | 4/2013 | Iwamura et al. |

(Continued)

FOREIGN PATENT DOCUMENTS

| CN | 103702376 A | 4/2014 |
| CN | 103702376 B | 3/2017 |

OTHER PUBLICATIONS

Checko, et al. "Cloud radio access network architecture. Towards 5G mobile networks." Diss. Technical University of Denmark (DTU), 2016. 171 pages.
(Continued)

*Primary Examiner* — Kevin C. Harper
*Assistant Examiner* — Derrick V Rose
(74) *Attorney, Agent, or Firm* — Amin, Turocy & Watson, LLP

(57) ABSTRACT

Distribution of traffic to cells in a communication network can be controlled. User equipment (UE) can perform measurements regarding signal quality with cells and communicate measurement information and a connection request to a source cell. The source cell can establish an initial connection with the UE. Meanwhile, the UE can perform additional measurements and communicate additional measurement information to the source cell. A distribution management component (DMC) can analyze the measurement information and cell-related information and determine whether to redirect the UE from the source cell to a target cell based on the analysis results. If the DMC determines that the UE is to be redirected to the target cell, the DMC can release the connection to the source cell and communicate a redirect message that includes target cell information to the UE, and the UE can send a connection request to the target cell.

20 Claims, 11 Drawing Sheets

(51) Int. Cl.
*H04W 76/10* (2018.01)
*H04B 17/336* (2015.01)

(56) References Cited

U.S. PATENT DOCUMENTS

| | | |
|---|---|---|
| 8,886,209 B2 | 11/2014 | Shaw et al. |
| 8,929,234 B1 | 1/2015 | Vivanco et al. |
| 8,942,636 B2 | 1/2015 | Gupta et al. |
| 8,942,710 B2 | 1/2015 | Brisebois |
| 8,953,444 B2 | 2/2015 | Ghosh et al. |
| 9,055,501 B2 | 6/2015 | Ekemark |
| 9,226,180 B2 | 12/2015 | Chandrasekhar et al. |
| 9,277,449 B2 | 3/2016 | Wu |
| 9,277,470 B2 | 3/2016 | Laroia et al. |
| 9,307,428 B2 | 4/2016 | Bhatia et al. |
| 9,392,491 B2 | 7/2016 | Palat et al. |
| 9,432,881 B2 | 8/2016 | Zhang et al. |
| 9,510,240 B2 | 11/2016 | Lorca et al. |
| 9,526,031 B2 | 12/2016 | Siomina et al. |
| 9,544,159 B2 | 1/2017 | Nagata et al. |
| 9,565,577 B2 | 2/2017 | Kapnadak et al. |
| 9,572,070 B2 | 2/2017 | Brisebois et al. |
| 9,642,155 B2 | 5/2017 | Wijetunge et al. |
| 9,872,204 B2 | 1/2018 | Chan et al. |
| 10,484,918 B2 | 11/2019 | Wang et al. |
| 2007/0274228 A1 | 11/2007 | Nandagopalan et al. |
| 2009/0106571 A1 | 4/2009 | Low et al. |
| 2009/0163223 A1 | 6/2009 | Casey |
| 2010/0118731 A1* | 5/2010 | Koyanagi ............ H04W 24/08 370/252 |
| 2011/0045819 A1 | 2/2011 | Lee et al. |
| 2011/0237238 A1* | 9/2011 | Hassan ............ H04M 15/8055 455/422.1 |
| 2012/0106346 A1* | 5/2012 | Aguirre ............ H04W 28/08 370/237 |
| 2012/0263145 A1 | 10/2012 | Marinier et al. |
| 2012/0314569 A1 | 12/2012 | Liu et al. |
| 2014/0269355 A1* | 9/2014 | Monogioudis ........ H04W 24/02 370/252 |
| 2015/0031360 A1 | 1/2015 | Choi et al. |
| 2015/0189533 A1 | 7/2015 | Fehske et al. |
| 2015/0264579 A1* | 9/2015 | Claussen ............ H04W 16/28 455/452.1 |
| 2015/0312805 A1 | 10/2015 | Cui et al. |
| 2015/0312822 A1* | 10/2015 | Bangolae ............ H04W 36/08 370/311 |
| 2015/0358883 A1 | 12/2015 | Axelsson et al. |
| 2016/0021573 A1 | 1/2016 | Kant |
| 2016/0112902 A1 | 4/2016 | Huh et al. |
| 2016/0119813 A1 | 4/2016 | Sridhar et al. |
| 2016/0192239 A1 | 6/2016 | Salvador et al. |
| 2016/0192370 A1 | 6/2016 | Chan et al. |
| 2016/0295459 A1 | 10/2016 | Bryson |
| 2016/0295572 A1 | 10/2016 | Hahn et al. |
| 2016/0277968 A1 | 11/2016 | Ekemark et al. |
| 2017/0289867 A1 | 10/2017 | Fan Hahn et al. |
| 2017/0332303 A1* | 11/2017 | Sunay ............ H04W 8/22 |
| 2018/0049030 A1 | 2/2018 | Manepalli et al. |
| 2018/0049267 A1 | 2/2018 | Chen et al. |
| 2018/0359666 A1* | 12/2018 | Wang ............ H04W 56/001 |
| 2019/0159078 A1* | 5/2019 | Wang ............ H04W 8/08 |

OTHER PUBLICATIONS

Office Action dated Nov. 28, 2017 for U.S. Appl. No. 15/596,457, 31 pages.
LTE CA: Carrier Aggregation Tutorial [http://www.radio-electronics.com/info/cellulartelecomms/lte-long-term-evolution/4g-lte-advanced-carrier-channel-aggregation.php] retrieved Feb. 17, 2017, 4 pages.
Office Action dated Feb. 20, 2019 for U.S. Appl. No. 15/623,289, 37 pages.
Final Office Action received for U.S. Appl. No. 16/599,942 dated Oct. 9, 2020, 37 pages.

\* cited by examiner

LOAD BALANCING IN WIRELESS NETWORKS TO ENHANCE USER EXPERIENCE

TECHNICAL FIELD

This disclosure relates generally to communications, e.g., to load balancing in wireless networks to enhance user experience.

BACKGROUND

Communication devices (e.g., mobile phones, electronic pads or tablets, computers, . . . ) can operate and communicate wirelessly via communication links (e.g., channels) in a communication network. The communication network can comprise a number of sectors, which each can include a number of cells, wherein respective communication devices can connect to respective cells to facilitate wireless communication of data traffic by and between the communication devices. Respective cells can have respective (e.g., different (or same)) characteristics, resources, and capacities with respect to handling the communication of traffic associated with communication devices, wherein, for example, some cells (e.g., in a sector) can have more resources and/or a higher capacity to handle communication of traffic than other cells (e.g., in a sector).

The above-described description is merely intended to provide a contextual overview relating to communications, and is not intended to be exhaustive.

DETAILED DESCRIPTION

Figure 1:
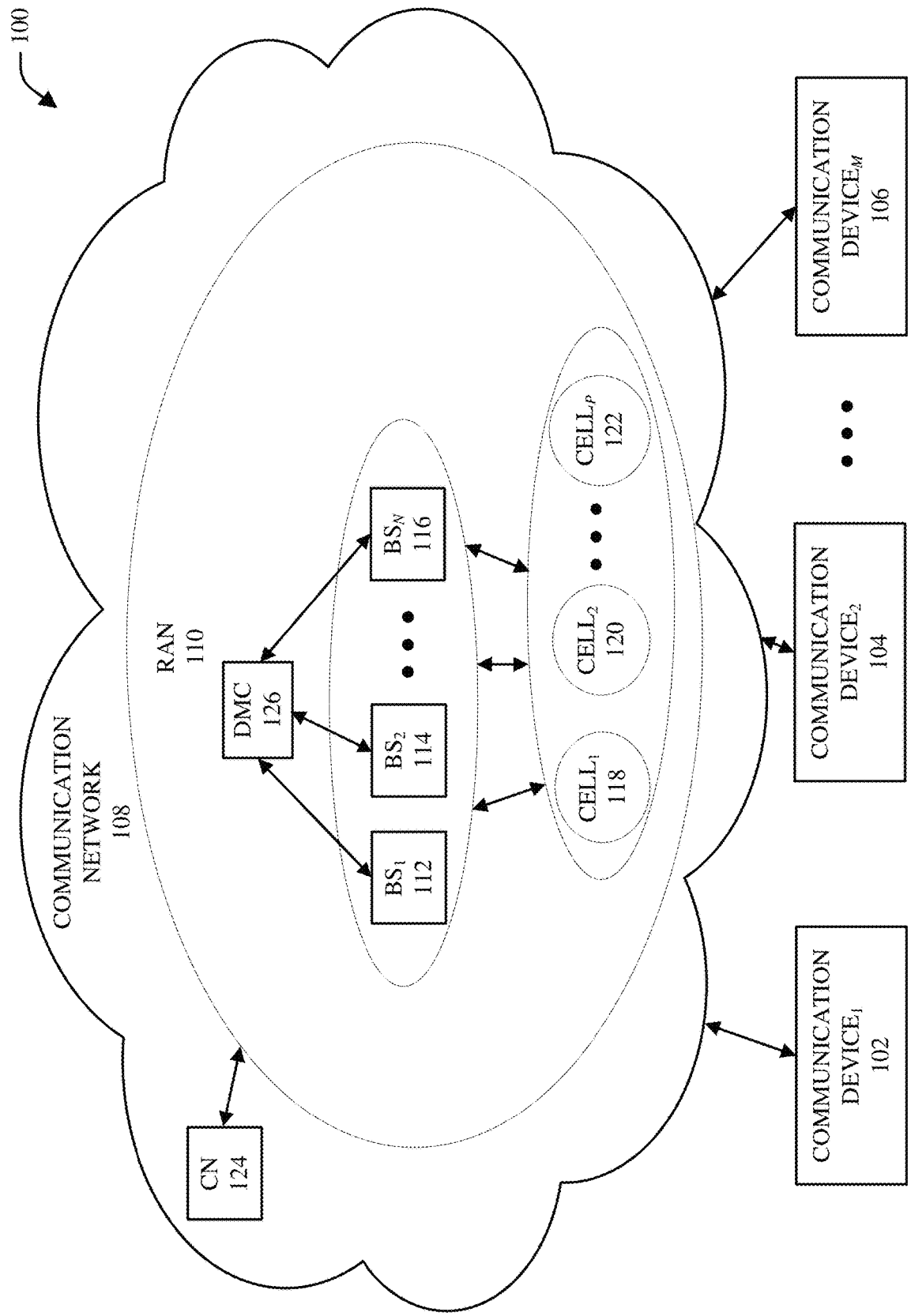
FIG. 1 illustrates a block diagram of an example system 100 that can facilitate controlling distribution of traffic and load balancing in a communication network, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

User equipment (UE), e.g., communication devices (e.g., mobile phones, electronic pads or tablets, computers, devices in or integrated with vehicles, . . . ), can operate and communicate wirelessly via communication links (e.g., channels) in a communication network. The communication network can comprise a number of sectors, which each can include a number of cells, wherein respective communication devices can connect to respective cells to facilitate wireless communication of data traffic by and between the communication devices. Respective cells can have respective (e.g., different (or same)) characteristics, resources, and capacities with respect to handling the communication of traffic associated with communication devices. For example, some cells (e.g., in a sector) can have more resources and/or a higher capacity to handle communication of traffic than other cells (e.g., in a sector).

In a particular area where communication devices are being used by users, there can be more than one cell to which certain communication devices can connect. There can be instances where a significant number of communication devices are connected to one cell, even to the point of overloading the cell such that the service to the communication devices can be degraded, while a neighbor cell to which some of those communication devices are able to connect, but are not connected, can be underutilized and its available resources wasted (e.g., by not being utilized). Such inefficiencies in the communication network can result in an undesirable user experience for users of the communication devices. Thus, both network efficiency and user experience can be degraded without proper traffic distribution in the communication experience.

Communication networks can employ load balancing to try to manage distribution of traffic among different cells or carriers in the communication network. UEs in the wireless communication network can be distributed among the cells or carriers of the communication network, wherein respective UEs can be connected to respective cells or carriers by the communication network based on certain predefined policies of the communication network. Such predefined policies, however, generally may not be designed to optimize user performance. For example, it can be desirable to connect a UE to a cell that has the strongest signal strength with the UE, as compared to other cells in the network. However, it can be undesirable to connect the UE to that cell, if that cell is overloaded (e.g., if a high portion of the radio resources of the cell are being used by other UEs), even if the cell has the highest signal strength with the UE, as compared to the other cells. However, some predefined policies will specify connecting the UE to the cell with which it has the strongest signal strength, regardless of whether the cell is overloaded.

Certain types of communication network designs can employ load balancing approaches that can distribute traffic from a network-centric point of view. For instance, certain load balancing approaches or algorithms typically can focus on distributing traffic such that network resources are substantially equally utilized. Such load balancing approaches or algorithms usually can aim to avoid or reduce network congestion in a communication network. While such load balancing approaches may ostensibly result in better use of radio resources in the communication network, such load balancing approaches can have various deficiencies that can result in an undesirable (e.g., unfavorable or less than optimal) user experience for the users of communication devices in the communication network.

In radio access networks (RANs), load balancing can be achieved through idle-mode reselection or connected-mode inter-frequency handover. However, each of these modes can have its own limitations with regard to achieving load balancing. For example, the idle-mode reselection generally cannot enable selectively maneuvering individual UEs to different carriers, and the connected-mode inter-frequency handover can contain a specific measurement gap with regard to measuring signal conditions (e.g., signal qualities, or signal strengths) for UEs with respect to cells, wherein the measurement gap can degrade retainability and throughput of UEs.

For instance, while in idle mode, a UE can be camping on a given cell or carrier, without a communication connection being established between the UE and the given cell or carrier, wherein the UE can camp on the given carrier or cell by adjusting a cell or carrier's priority, cell selection/reselection parameters, etc. The configuration of the parameters can be static and can be done manually. Under predefined policies, with a UE in the idle mode, there can be drawbacks or limitations with regard how a communication network decides whether to move the UE from one cell to another cell, as the communication network can adjust certain cell-level parameters (e.g., setting or adjusting different cell priorities, setting or adjusting cell selection/reselection parameters or thresholds) to facilitate moving the UE from one cell to another cell, but is not able to operate down at the UE level to perform adjustments to parameters at the UE level to facilitate moving the UE from one cell to another cell. One of the positive aspects of the idle mode is that the UE can perform measurements (e.g., radio frequency (RF) measurements) of signals without disrupting service (e.g., without having a measurement gap in order to perform the measurements).

When a UE is in an connected mode (e.g., active mode), there can be connected mode control of the UE that can be realized, for example, by handing over the UE, which is already connected to a first cell or carrier, from the first cell or carrier to a second cell or carrier. When a UE is in the connected mode, there can be other drawbacks or limitations of predefined policies. For instance, while in connected mode (e.g., when the UE is transmitting or receiving voice or traffic data), when the UE is measuring signals (e.g., signal qualities or signal strengths) of signals from cells (e.g., measuring signal conditions for different frequencies), the UE has to stop communicating (e.g., transmitting, receiving) for a short period of time to perform the measurements, wherein such period of time can be referred to as a measurement gap, and wherein after the measurement gap, the UE can resume communications (e.g., if the connection is not lost during the measurement gap). The ceasing of communications during the measurement gap can negatively impact throughput (e.g., data throughput) of UEs, can degrade retainability of the communication connection between a UE and a cell (e.g., can result in dropped calls or other loss of communication connection), and can result in an inefficient use of network resources of the communication network. It can be desirable to overcome these and other deficiencies associated with these and other predefined policies.

To that end, techniques for controlling distribution of traffic to cells in a communication network are presented. The disclosed subject matter can take into account a user point of view as well as a network point of view with regard to traffic distribution in a communication network to improve overall user experience as well as to improve the use of network resources in the communication network. The disclosed subject matter can employ improved traffic distribution and load balancing techniques and algorithms (e.g., defined distribution management algorithms) to more desirably manage distribution of traffic in a communication network to more efficiently utilize network resources and improve (e.g., enhance or optimize) user experience. The disclosed subject matter can remove constraints of network architecture and protocol limitations of communication networks, including, for example, certain constraints relating to idle-mode reselection and connected-mode inter-frequency handover.

A communication device can perform measurements regarding respective signal conditions (e.g., signal qualities, signal strengths, . . . ) with respective cells and can communicate measurement information regarding the respective signal conditions and a connection request to a source cell. The source cell can establish an initial connection with the communication device. Meanwhile, the communication device can perform additional measurements regarding respective signal conditions with the respective cells, and can communicate the additional measurement information regarding the respective signal conditions to the source cell. A distribution management component can analyze all of the measurement information and cell-related information (e.g., respective performance indicators, characteristics, etc., of respective cells) that can be received from respective cells, and can determine whether to redirect the communication device from the source cell to a target cell based at least in part on the analysis results. If the distribution management component determines that the communication device is to be redirected to the target cell, the distribution management component can release the connection to the source cell and communicate a redirect message that includes redirected target cell information to the communication device, and the communication device can send a connection request to the target cell to facilitate establishing a connection (e.g., a radio resource control (RRC) connection) to the target cell.

The disclosed subject matter therefore can be useful, and can be increasingly useful, as user performance becomes increasingly the goal for business (and users), and as networks (e.g., future networks, such as 5G networks) become increasingly user-centric, as it can become desirable from both business and technology viewpoints to optimize a communication network in terms of user performance. For instance, the disclosed subject matter can be applied in communication networks in the relatively near future, as, employing the techniques of the disclosed subject matter, radio access networks (RAN) can be evolved to the cloud (e.g., cloud computing environment) to exploit and leverage benefits of coordination among different base stations, such as, for example, coordinated multipoint (CoMP) communications and carrier aggregation in Long Term Evolution (LTE)-Advanced, enhanced inter-cell interference coordination (eICIC) in LTE heterogeneous networks (HetNet), and the cloud-native 5G communication networks.

These and other aspects and embodiments of the disclosed subject matter will now be described with respect to the drawings.

Referring now to the drawings, FIG. 1 illustrates a block diagram of an example system 100 that can facilitate controlling distribution of traffic and load balancing in a communication network, in accordance with various aspects and embodiments of the disclosed subject matter. The system 100 can comprise a set of communication devices, which can include communication devices 102, communication device$_2$ 104, up through communication device$_M$ 106, wherein M can be virtually any desired number. A communication device can be, for example, a mobile and/or wireless communication device, such as a mobile phone, an electronic notebook, an electronic pad or tablet, an electronic gaming device, a personal digital assistant (PDA), a computer, a set-top box, or other type of communication device that can operate and communicate in a communication network environment of a communication network 108 of the system 100.

The communication network 108 can comprise a radio access network (RAN) 110 that can comprise or be associated with a set of base stations (e.g., access points (APs)), including base stations 112 (BS$_1$ 112), base station$_2$ 114 (BS$_2$ 114), up through base station$_N$ 116 (BS$_N$ 116), that can serve communication devices (e.g., 102, 104, and/or 106, . . . ) located in respective coverage areas served by respective base stations (e.g., 112, 114, 116) in the communication network 108, wherein N can be virtually any desired number. In some embodiments, the RAN 110 can be a cloud-RAN (C-RAN) that can be located in or associated with a cloud computing environment, comprising various cloud network components of the communication network 108.

The respective base stations (e.g., 112, 114, 116) can be associated with one or more sectors (not shown in FIG. 1), wherein respective sectors can comprise respective cells. The cells can comprise cell$_1$ 118, cell$_2$ 120, up through cell$_P$ 122, that can have respective coverage areas that can form the coverage area covered by the one or more sectors, wherein P can be virtually any desired number. The respective communication devices (e.g., 102, 104, and/or 106, . . . ) can be communicatively connected to the communication network 108 via respective wireless communication connections with one or more of the respective cells (e.g., 118, 120, and/or 122, . . . ).

The respective cells (e.g., 118, 120, 122, . . . ) can have respective characteristics, features, and/or performance indicators (e.g., bandwidths, subcarrier activity factors, and/or other performance indicators (e.g., key performance indicators (KPIs)). For example, a first cell (e.g., 118) can have a first set of performance indicators (e.g., a first bandwidth associated with a first frequency band (e.g., 700 megahertz (MHz)), a first subcarrier activity factor (Q), . . . ), and a second cell (e.g., 120) can have a second set of performance indicators (e.g., a second bandwidth associated with a second frequency band (e.g., 1700 MHz, 1900 MHz, 2500 MHz, or other higher frequency, a second subcarrier activity factor, . . . ). The respective cells (e.g., 118, 120, 122, . . . ) can have respective capacities that can depend on a variety of factors, including, for example, the bandwidth of a cell, radio frequency (RF) conditions of communication devices (e.g., 102, 104, 106, . . . ) in the communication network 108, proximity to a tower, the number of neighbor towers in the area, and/or another factor(s) that can cause interference in communications in the communication network 108. Typically, the higher the capacity of a cell, the better performance that communication devices can experience (e.g., faster communication rates or data downloads). All other factors being equal, a cell (e.g., 120) having a higher frequency band (e.g., 1900 MHz) than another cell (e.g., 118) having a relatively lower frequency band (e.g., 700 MHz) will typically have a higher capacity than the other cell.

The coverage area of a cell (e.g., 118) can overlap one or more other coverage areas of one or more other cells (e.g., 120 and/or 122) that are, for example, adjacent or in proximity to the cell (e.g., 118). Also, in some embodiments, two cells (e.g., 118 and 120) can be associated with a same site, such as a site associated with a base station (e.g., 112). For example, a cell (e.g., 118) having a first set of characteristics, features, and/or performance indicators (e.g., bandwidths, subcarrier activity factors, and/or other performance indicators) and another cell (e.g., 120) having a second set of characteristics, features, and/or performance indicators can be associated with the same site, such as a site associated with a base station (e.g., 112). In other embodiments, two cells (e.g., 118 and 120) can be associated with different sites associated with different base stations (e.g., 112 and 114), wherein a first cell (e.g., 118) can be associated with a first base station (e.g., 112) and a second cell (e.g., 120) can be associated with a second base station (e.g., 114).

Figure 2:
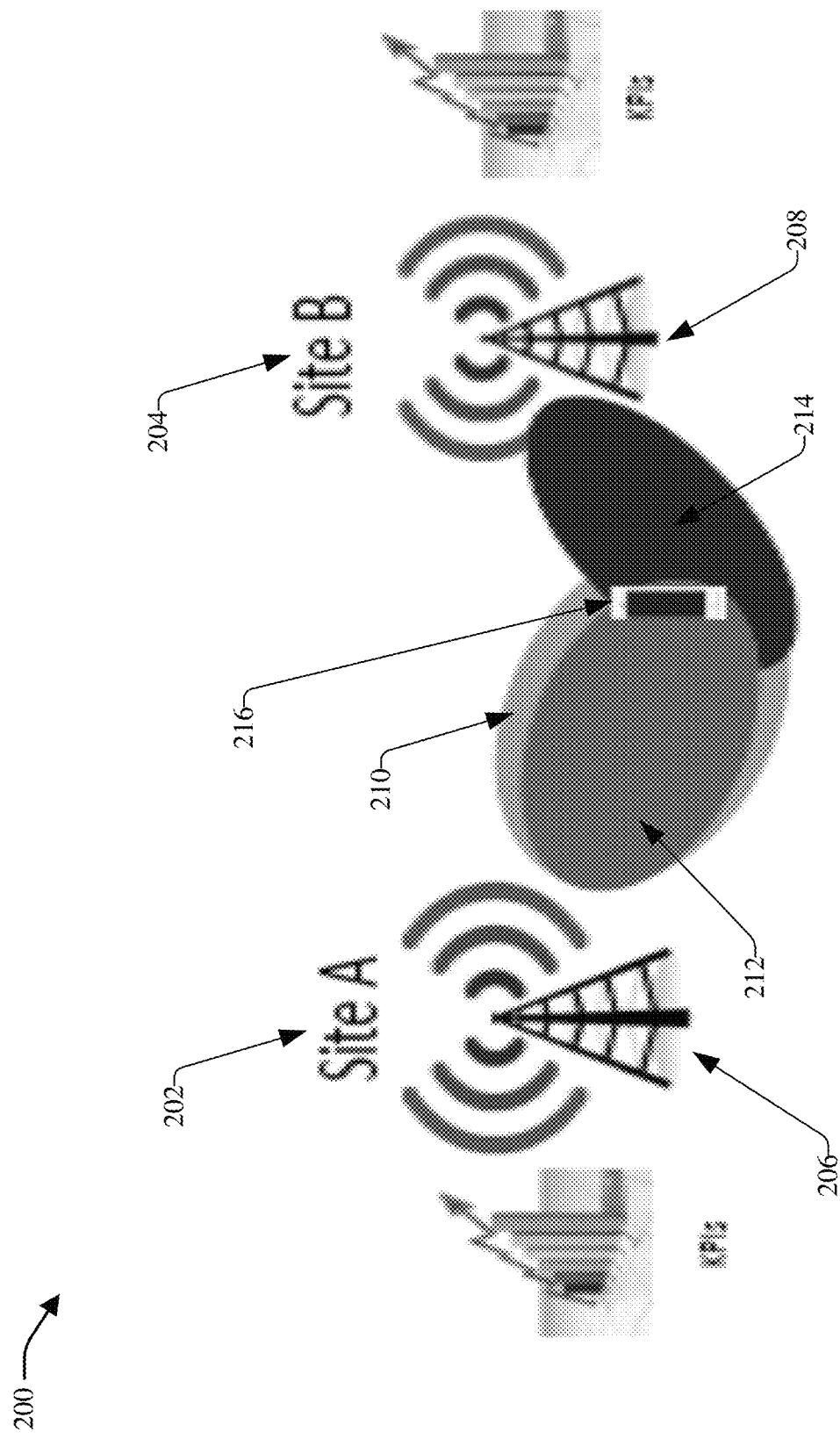
FIG. 2 depicts a diagram of an example portion of a communication network that can comprise cells that can overlapping coverage areas, in accordance with various aspects and embodiments of the disclosed subject matter.

Referring briefly to FIG. 2 (along with FIG. 1), FIG. 2 depicts a diagram of an example portion of a communication network 200 that can comprise cells that can overlapping coverage areas, in accordance with various aspects and embodiments of the disclosed subject matter. In the example portion of the communication network 200, that can be two sites 202 and 204 in respective physical locations, wherein the two sites 202 and 204 can comprise respective base stations 206 and 208. The respective base stations 206 and 208 can be associated with respective carriers or cells (not explicitly shown in FIG. 2), wherein, for example, the base station 206 can be associated with a first carrier or cell that can cover a first coverage area 210 and a second carrier or cell that can cover a second coverage area 212, and the base station 208 can be associated with a third carrier or cell that can cover a third coverage area 214. The first, second, and third carriers or cells can have respective characteristics, features, and/or performance indicators (e.g., KPIs)

A communication device 216 in the area of the sites 202 and/or 204 can be located in one or more of the coverage areas (e.g., 210, 212, and/or 214) covered by the carriers or cells associated with the sites 202 and/or 204. As depicted in FIG. 2, for example, the communication device 216 can be located in the area covered by the sites 202 and 204 such that the communication device 216 can be located in and covered by the first coverage area 210 associated with the first carrier or cell, the second coverage area 212 associated with the second carrier or cell, and the third coverage area 214 associated with the third carrier or cell, wherein the respective carriers or cells can have respective signal conditions (e.g., signal qualities, signal strengths, . . . ) with regard to the communication device 216. While certain network policies can connect the communication device 216 to the carrier or cell that has the strongest signal with the communication device 216, the disclosed subject matter can determine which carrier or cell is the best carrier cell to which the communication device 216 is to be connected to achieve desirable (e.g., enhanced, optimal, or suitable) distribution of traffic and load balancing in the communication network, utilization of network resources, and user experience by communication device users, in accordance with various aspects and embodiments of the disclosed subject matter, as more fully described herein.

The signal conditions of cells can comprise or relate to signal quality of a signal between a cell and a communication device, signal strength of a signal between a cell and a communication device, and/or another type of signal condition between a cell and a communication device. With regard to LTE systems, for example, the signal quality can be, comprise, or relate to a reference signal received quality (RSRQ), the signal strength can be, comprise, or relate to a reference signal strength indicator (RSSI), and the signal power can be, comprise, or relate to a reference signal received power (RSRP), wherein the RSRP can be an RSSI type of measurement (e.g., RSRP can indicate signal strength of a signal).

With further regard to FIG. 1, the RAN 110 can be associated with (e.g., connected to) a core network 124 (e.g., mobile core network) that can facilitate communications by communication devices (e.g., 102, 104, 106, . . . ) wirelessly connected to the communication network 108. A communication device (e.g., 102) can be communicatively connected to the core network 124 via a base station (e.g., 112). The core network 124 (CN 124) can facilitate wireless communication of voice and data associated with communication devices (e.g., 102, 104, 106, . . . ) associated with the communication network 108. The core network 124 can facilitate routing voice and data communications between communication devices and/or other communication devices (e.g., phone, computer, email server, multimedia server, audio server, video server, news server, financial or stock information server, other communication devices associated with an IP-based network (e.g., the Internet, an intranet, . . . ) (not shown in FIG. 1) associated with the communication network 108. The core network 124 also can allocate resources to the communication devices (e.g., 102, 104, 106, . . . ) associated with the communication network 108 in the communication network environment, convert or enforce protocols, establish and enforce quality of service (QoS) for the communication devices, provide applications or services in the network 108, translate signals, and/or perform other desired functions to facilitate system interoperability and communication in the wireless communication network 108. The core network 124 further can include desired components, such as routers, nodes (e.g., general packet radio service (GPRS) nodes, such as serving GPRS support node (SGSN), gateway GPRS support node (GGSN), etc.), switches, interfaces, controllers, etc., that can facilitate communication of data between communication devices associated with the communication network 108.

In some implementations, the RAN 110 can comprise a distribution management component (DMC) 126 that can facilitate desirably controlling distribution of traffic associated with communication devices (e.g., 102, 104, 106, . . . ) among the cells (e.g., 118, 120, 122, . . . ) of the communication network 108. In some embodiments, the distribution management component 126 can determine whether to redirect a communication device (e.g., 102) from a first (e.g., source) cell (e.g., 118) to a second (e.g., target) cell (e.g., 120) to facilitate controlling the distribution of traffic and load balancing in a communication network, and/or enhancing user experience of communication device users, in accordance with various aspects and embodiments of the disclosed subject matter.

In certain embodiments, the distribution management component 126 can be associated with (e.g., connected to) the base stations (e.g., 112, 114, 116, . . . ) of the RAN 110 (e.g., as depicted in FIG. 1). In other embodiments, the distribution management component 126 can be part of a base station (e.g., 112) or can be distributed among the base stations (e.g., 112, 114, 116, . . . ) of the RAN 110.

Figure 3:
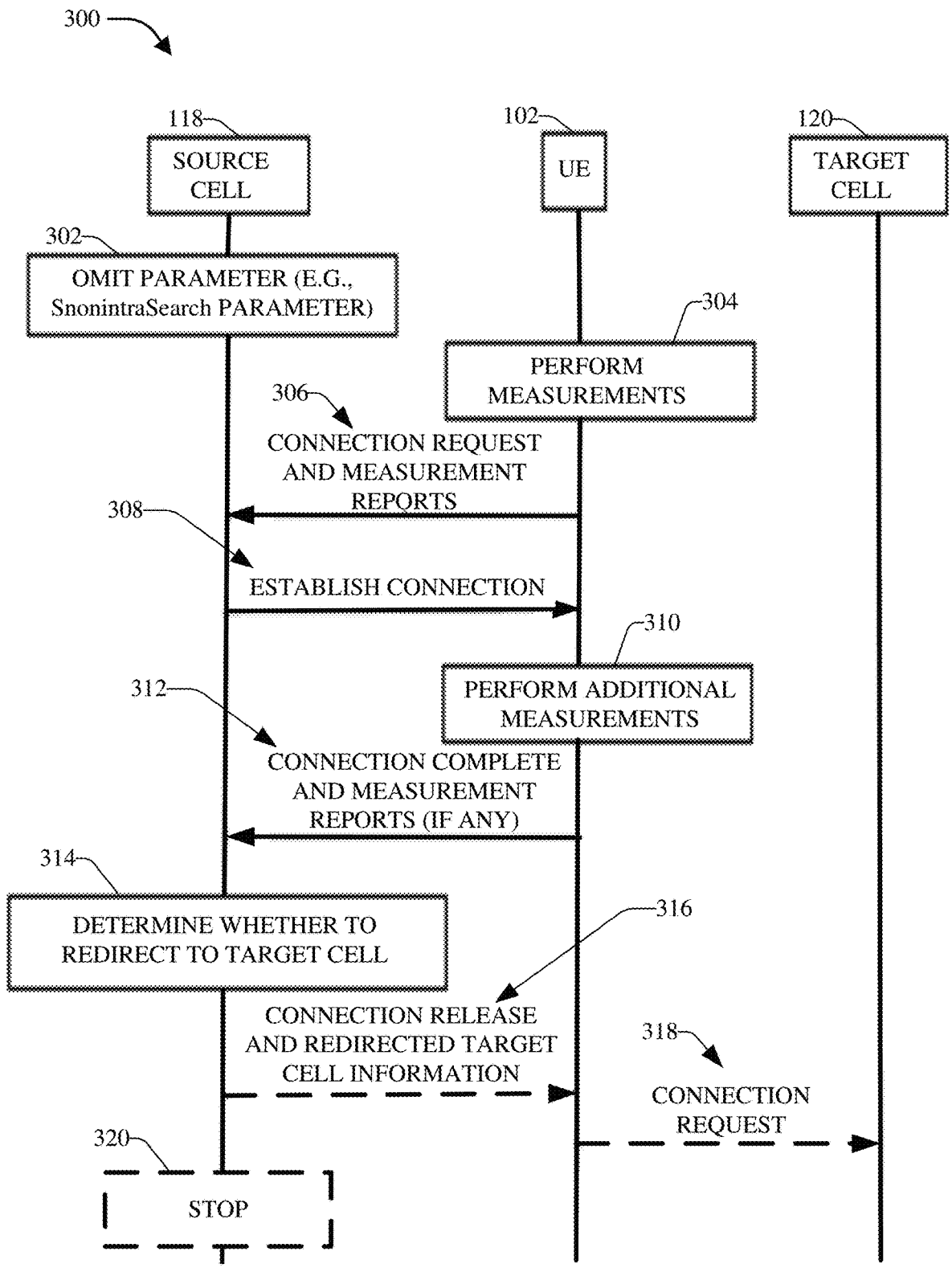
FIG. 3 illustrates a diagram of an example protocol flow that can be employed to facilitate determining whether to redirect a communication device from a source cell to a target cell before real data (e.g., user data payload) transmission to enhance load balancing, network resource utilization, and user experience, in accordance with various aspects and embodiments of the disclosed subject matter.

Referring to FIG. 3 (along with FIG. 1), FIG. 3 illustrates a diagram of an example protocol flow 300 that can be employed to facilitate determining whether to redirect a communication device from a source cell to a target cell before real data (e.g., user data payload) transmission to enhance load balancing, network resource utilization, and user experience, in accordance with various aspects and embodiments of the disclosed subject matter. With regard to communication device$_1$ 102 (UE 102), the communication device$_1$ 102 can desire to connect to a cell in the communication network 108. At this time, the communication device$_1$ 102 can be in idle mode, for example. While in idle mode, the communication device$_1$ 102 initially can be camping on a given cell or carrier (e.g., cells 118), without a communication connection being established between the communication device$_1$ 102 and the given cell or carrier, wherein the communication device$_1$ 102 can camp on the given carrier or cell As depicted at reference numeral 302, a serving cell (e.g., 118, 120, or 122) can omit a parameter (e.g., for LTE systems, a SnonintraSearch parameter in SystemInformationBlockType3 (SIB3)) that can prevent communication devices from performing inter-frequency measurements of the respective signal conditions (e.g., signal qualities, signal strengths, . . . ) of the respective cells (e.g., 118, 120, 122, . . . ), while the communication devices are in idle mode (if there is such a parameter in place). As a result, the communication device$_1$ 102 can perform inter-frequency measurements of the respective signal conditions of the respective cells (e.g., 118, 120, 122, . . . ), even while in idle mode, and regardless of the cell priorities of the cells (e.g., 118, 120, 122, . . . ). As a further result, since the communication device$_1$ 102 can perform inter-frequency measurements of the respective signal conditions of the respective cells while in idle mode, such measurements can be performed by the communication device$_1$ 102 without the communication device$_1$ 102 experiencing the measurement gap that can be associated with connected-mode inter-frequency handover measurements.

As illustrated at reference numeral 304, while in idle mode, the communication device$_1$ 102 can perform measurements of respective signal conditions of the respective cells (e.g., 118, 120, 122, . . . ) providing wireless communication coverage in the area where the communication device$_1$ 102 is located. The measurements can comprise inter-frequency measurements of the respective signal conditions of the respective cells (e.g., 118, 120, 122, . . . ) for same or different frequency bands (e.g., 700 MHz, 1700 MHz, 1900 MHz, 2500 MHz, or other frequency band(s)).

The communication device$_1$ 102 can determine and select one of the cells to which the communication device$_1$ 102 desires to connect. For example, the communication device$_1$ 102 can select the cell of the cells that has the strongest or highest signal condition (e.g., signal quality, signal strength, . . . ) with regard to the communication device$_1$ 102, or can select the cell based on another criterion (e.g., another distribution management criterion).

As depicted at reference numeral 306, the communication device$_1$ 102 can communicate a connection request (e.g., a radio resource control (RRC) connection request) to a cell, such as cells 118, to request connection to the cells 118 (e.g., source cell). As part of or along with the connection request, the communication device$_1$ 102 can communicate measurement reports, which can comprise information regarding the respective signal conditions of the respective cells (e.g., 118, 120, 122, . . . ) with respect to the communication device$_1$ 102, to the cells 118. The distribution management component 126 can receive the measurement reports, for example, from the cells 118.

As indicated at reference numeral 308, the cells 118 (e.g., source cell) can establish the connection (e.g., RRC connection) with the communication device$_1$ 102 and can communicate connection information to the communication device$_1$ 102. As depicted at reference numeral 310, after the communication device$_1$ 102 has sent the connection request and measurement reports to the cells 118, and while waiting for the connection to be established with the cells 118, the communication device$_1$ 102 (e.g., while still in idle mode) can (e.g., optionally can) perform additional measurements (e.g., inter-frequency measurements) of the respective signal conditions of the respective cells (e.g., 118, 120, 122, . . . ) with respect to the communication device$_1$ 102. As illustrated at reference numeral 312, the communication device$_1$ 102 can communicate a message (e.g., acknowledgement message) that can acknowledge the establishment of the connection between the cells 118 and the communication device$_1$ 102 and/or facilitate completing the establishment of such connection. As part of or along with the message, the communication device$_1$ 102 can communicate additional (e.g., updated) measurement reports, comprising information regarding the additional (e.g., updated) measurements of the respective signal conditions of the respective cells (e.g., 118, 120, 122, . . . ) with respect to the communication device$_1$ 102, to the cells 118 (e.g., source cell). The distribution management component 126 can receive the additional measurement reports, for example, from the cells 118.

In some embodiments, the distribution management component 126 also can receive or obtain (e.g., automatically or dynamically receive in real or substantially real time) respective cell-related information, such as, for example, respective performance indicator (e.g., KPI) information, respective information regarding cell-related characteristics, etc., from the respective cells (e.g., 118, 120, 122, . . . ). The respective performance indicators of the respective cells (e.g., 118, 120, 122, . . . ) can comprise, for example, the respective bandwidths of the respective cells, the respective activity factors (e.g., respective subcarrier activity factors) or congestion levels of the respective cells, and/or one or more other types of performance indicators. The distribution management component 126 can receive at least a portion of the respective cell-related information from the respective cells (e.g., 118, 120, 122, . . . ) in real time or substantially real time.

As depicted at reference numeral 314, on the source cell side, the distribution management component 126 can determine (e.g., automatically or dynamically determine in real or substantially real time) whether to redirect the communication devices 102 from the source cell (e.g., cell$_1$ 118) to a target cell (e.g., cell$_2$ 120) based at least in part on the results of analyzing the information (e.g., signal condition information) in the measurement reports and/or the additional information in the additional measurement reports, and the respective cell-related information (e.g., performance indicators, characteristics, . . . ) of the respective cells (e.g., 118, 120, 122, . . . ), in accordance with the defined distribution management criteria and defined algorithm (e.g., a distribution management algorithm relating to traffic distribution and load balancing), as more fully described herein. The defined distribution management criteria can relate to, for example, which cell of the respective cells (e.g., 118, 120, 122, . . . ) can provide the best (e.g., highest) throughput of traffic for the device, which cell of the respective cells has the smallest amount of resource utilization, or which cell of the respective cells has the smallest average number of devices connected to it, as more fully described herein. For instance, the distribution management component 126 can determine (e.g., automatically or dynamically determine in real or substantially real time) which cell of the respective cells (e.g., 118, 120, 122, . . . ) is the best cell to which the communication devices 102 is to be connected to achieve desirable (e.g., improved, optimal, or acceptable) distribution of traffic and load balancing in the communication network 108, enhance network resource utilization for the communication network 108 (e.g., network resources can be more efficiently utilized by desirably balancing the traffic load among different cells or carriers), enhance user experience of the user of the communication device$_1$ 102, and enhance overall performance of the communication network 108 (e.g., enhance overall user experience of all communication device users, enhance overall performance of all communication devices, in the communication network 108, . . . ), in accordance with the defined distribution management criteria and the defined algorithm (e.g., a distribution management algorithm). As a result, the disclosed subject matter also can provide a financial benefit (e.g., financial enhancement) to a carrier entity associated with a communication network (e.g., owning or operating the communication network, or portion thereof). In some embodiments, the distribution management component 126 can perform (e.g., automatically or dynamically perform in real or substantially real time) the information analysis and determination regarding whether to redirect the communication device$_1$ 102 from the source cell (e.g., cells 118) to a target cell (e.g., cell$_2$ 120) before a data transmission (e.g., transmission of real or user data) is performed between the communication device$_1$ 102 and source cell and/or before the source cell has allocated resources (e.g., resources used to transmit or facilitate transmission of data) to the communication device$_1$ 102.

If the distribution management component 126 determines that the communication device$_1$ 102 is to be redirected from the source cell (e.g., cells 118) to a target cell (e.g., cell$_2$ 120) (e.g., determines that the target cell is the best cell of the respective cells for the communication device$_1$ 102 to connect to), as indicated at reference numeral 316, the source cell (e.g., cells 118) can release the connection (e.g., RRC connection) with the communication device$_1$ 102, wherein, as part of or along with communicating the release message to the communication device$_1$ 102 to facilitate releasing the connection, target cell-related information can be communicated to the communication device$_1$ 102 to facilitate notifying the communication device$_1$ 102 that it is being redirected to the target cell (e.g., cell$_2$ 120) and providing information (e.g., identification information that can identify the target cell and/or target cell-related parameters) to the communication device$_1$ 102. For instance, the distribution management component 126 can instruct the source cell (e.g., cells 118) that the communication device₁ 102 is to be redirected to the target cell and can provide target cell-related information to the source cell, which can be forwarded to the communication device₁ 102.

As illustrated at reference numeral 318, based at least in part on the target cell-related information, the communication device₁ 102 can determine which cell (e.g., cell₂ 120) is the target cell to which it is to be connected, and the communication device₁ 102 can communicate a connection request (e.g., RRC connection request) to the target cell (e.g., cell₂ 120) to facilitate connecting to the target cell. At this point, the protocol flow 300 can end. The target cell (e.g., cell₂ 120) can allocate resources to the communication device₁ 102, and voice or data traffic can be communicated between the communication device₁ 102 and the target cell.

However, if, as a result of the information analysis and determination associated with reference numeral 314, the distribution management component 126 determines that the communication device₁ 102 is not to be redirected from the source cell (e.g., cells 118) to a target cell (e.g., cell₂ 120), but rather is to remain connected to the source cell (e.g., determines that the source cell is the best cell of the respective cells for the communication device₁ 102 to be connected to), as depicted at reference numeral 320, the distribution management component 126 can instruct the source cell (e.g., cells 118) that the communication device₁ 102 is to remain connected to and served by the source cell, and the protocol flow 300 can end. The source cell (e.g., cells 118) can allocate resources to the communication device₁ 102, and voice or data traffic can be communicated between the communication device₁ 102 and the source cell (e.g., cells 118).

With further regard to FIG. 1, as disclosed herein, the distribution management component 126 can determine which cell of the respective cells (e.g., 118, 120, 122, . . . ) is the best (e.g., optimal, or most suitable) cell to which the communication device₁ 102 is to be connected to achieve desirable (e.g., improved, optimal, or suitable) distribution of traffic and load balancing in the communication network 108, enhance network resource utilization for the communication network 108, enhance user experience of the user of the communication device₁ 102, and enhance overall performance of the communication network 108, in accordance with the defined distribution management criteria and the defined algorithm (e.g., defined distribution management algorithm). In some embodiments, the defined distribution management criteria can relate to, for example, which cell of the respective cells (e.g., 118, 120, 122, . . . ) can provide the best (e.g., highest) throughput of traffic for the communication device₁ 102.

For instance, the distribution management component 126 can analyze the information in the measurement reports (e.g., signal conditions (e.g., signal qualities or signal strengths) of the respective cells) and/or the additional information (e.g., updated signal conditions of the respective cells) in the additional measurement reports, and the respective cell-related information (e.g., performance indicators, characteristics, . . . ) of the respective cells (e.g., 118, 120, 122, . . . ). Based at least in part on the results of the analysis, the distribution management component 126 can determine the respective throughputs of the respective cells (e.g., 118, 120, 122, . . . ) with respect to the communication device₁ 102. For example, for each cell, the distribution management component 126 can determine or estimate the throughput of the cell with respect to the communication device₁ 102 as a function of a signal condition (e.g., signal quality) associated with the cell and the communication device₁ 102 (e.g., as reported by the communication device₁ 102) and the performance indicators of the cell (e.g., as received by or reported to the distribution management component 126 of the RAN 110 from or by the cell). The function for determining or estimating the throughput for a cell with respect to a communication device can be determined or derived based at least in part on a defined distribution management algorithm, such as a defined throughput algorithm, for example.

In accordance with the defined throughput algorithm, for each cell (e.g., 118, 120, 122, respectively), the distribution management component 126 or the cell can determine (e.g., calculate), for the cell, the signal-to-interference-and-noise ratio (SINR) with regard to the communication device (e.g., 102) as a function of the signal quality associated with the cell and communication device, and the activity factor (e.g., subcarrier activity factor) associated with the cell, where the activity factor can be or can indicate a level of congestion (e.g., cell loading) of the cell (e.g., the percentage or relative level of resources being used by the cell). As an example with regard to LTE networks, when the signal quality (e.g., RSRQ) of the communication device (e.g., 102) is received from the communication device, the distribution management component 126 or the cell (e.g., 118, 120, or 122, respectively) can determine (e.g., calculate), for the cell, the SINR associated with the cell and communication device using Equation (1) as follows:

$$SINR = \frac{1}{\frac{1}{12 \cdot RSRQ} - \frac{4Q+1}{3}} \qquad \text{(Equation (1))}$$

wherein a 2×2 MIMO is assumed and Q can be the activity factor (e.g., subcarrier activity factor) for the cell. All terms in Equation (1) are in the linear domain (not in dBs). It is to be appreciated and understood that Equation (1) can be extended or modified to account for other types or representations of MIMO configurations (e.g., 4×2 MIMO, 4×4 MIMO, 8×2 MIMO, . . . ), other types or representations of signal quality values, other types or representations of activity factors, and/or other types of factors or parameters, in accordance with the disclosed subject matter.

In accordance with the defined throughput algorithm, the distribution management component 126 or another component can map SINR values to spectral efficiency values (e.g., spectral efficiency values in bits per second (bps)/Hertz (Hz)) based at least in part on field measurement data or validated simulation data relating to SINR values and spectral efficiency values. The distribution management component 126 can determine a spectral efficiency value for a cell (e.g., 118, 120, or 122, respectively) with respect to the communication device based at least in part on the mapping of the SINR values to spectral efficiency values (e.g., using the mapping, the distribution management component 126 can determine or identify the spectral efficiency value for the cell that corresponds or is mapped to the SINR value for the cell).

In accordance with the defined throughput algorithm, for each cell, (e.g., 118, 120, or 122, respectively) with a bandwidth (BW) in MHz and an activity factor (e.g., a cell loading) of Q of a cell can be known by the distribution management component 126 from the information (e.g., performance indicator information) received from the respective cells, and the distribution management component 126 can know the spectral efficiency (SE) for the cell from calculating the SINR for the cell and determining the spectral efficiency (e.g., spectral efficiency value) for the cell based at least in part on the SINR value and the mapping. The distribution management component 126 can determine (e.g., calculate) the throughput (e.g., $\text{Tput}_i$) for the cell (e.g., $\text{cell}_i$) with respect to the communication device (e.g., 102) as a function of the spectral efficiency (e.g., $SE_i$) associated with the cell (e.g., $\text{cell}_i$) and communication device, the bandwidth (e.g., $BW_i$) associated with the cell (e.g., $\text{cell}_i$), and the activity factor (e.g., $Q_i$) associated with the cell (e.g., $\text{cell}_i$), in accordance with the distribution management criteria. As an example with regard to LTE networks, the distribution management component 126 or the cell can determine (e.g., calculate), for the cell (e.g., $\text{cell}_i$), the throughput (e.g., $\text{Tput}_i$) for the cell (e.g., $\text{cell}_i$) with respect to the communication device (e.g., 102) using Equation (2) as follows:

$$T\text{put}_i = SE_i * BW_i * (1 - Q_i). \quad \text{(Equation (2))}$$

The distribution management component 126 can determine the best cell of the respective cells for the communication device (e.g., 102) to connect to based at least in part on the respective throughput values (e.g., respective Tputs) of the respective cells, in accordance with the defined distribution management criteria. For example, the distribution management component 126 can analyze or evaluate the respective throughput values of the respective cells, and can determine or identify the cell that has the highest throughput value with respect to the communication device (e.g., 102), based at least in part on the results of analyzing or evaluating the respective throughput values of the respective cells.

In some embodiments, the distribution management component 126 can analyze or evaluate the respective throughput values and the respective signal conditions (e.g., signal qualities, signal strengths, ... ) of the respective cells. Based at least in part on the results of analyzing the respective signal conditions of the respective cells, the distribution management component 126 can determine or identify a subset of the respective cells that are qualifying cells that satisfy a minimum threshold signal condition (e.g., a minimum threshold signal quality), in accordance with the defined distribution management criteria. Based at least in part on the results of analyzing the respective throughput values of the cells of the subset of the respective cells, the distribution management component 126 can determine or identify the cell of the subset of respective cells (e.g., qualifying cells) that has the highest throughput value as compared to the throughput values of the other cells of the subset of respective cells, wherein the distribution management component 126 can determine that such cell is the best cell to which the communication device (e.g., 102) is to connect, in accordance with the defined distribution management criteria.

If the best cell is the source cell (e.g., 118), the distribution management component 126 can determine that the communication device (e.g., 102) is to remain connected to the source cell, and the source cell can allocate desired network resources to the communication device (e.g., 102) and voice or data traffic can be communicated between the communication device (e.g., 102) and the source cell. If the best cell is not the source cell (e.g., 118), but rather is another (e.g., target) cell (e.g., 120), the distribution management component 126 can determine that the communication device (e.g., 102) is to redirected to the target cell, the distribution management component 126 can facilitate releasing the connection between the communication device (e.g., 102) and the source cell (e.g., 118) and can communicate cell-related information (e.g., target cell-related information) regarding the target cell (e.g., 120) to the communication device to notify the communication device that it is being redirected to the target cell and provide information regarding the target cell to the communication device to facilitate enabling the communication device to contact the target cell and request a connection to the target cell.

In certain embodiments, the defined distribution management criteria can relate to determining which cell of the respective cells has the smallest amount of resource utilization. The distribution management component 126 can determine or facilitate determining which cell of the cells (e.g., 118, 120, 122, ... ) is the most desirable (e.g., best) cell to which the communication device (e.g., 102) is to be connected based at least in part on the respective levels of resource utilization of the respective cells.

For example, the distribution management component 126 can determine the respective levels of resource utilization of the respective cells (e.g., 118, 120, 122, ... ) (or a subset of qualifying cells) based at least in part on the results of analyzing respective performance indicator information of the respective cells. In some embodiments, the distribution management component 126 also can determine respective signal conditions (e.g., signal qualities, signal strengths) associated with the respective cells (e.g., 118, 120, 122, ... ) based at least in part on the results of analyzing the respective signal condition information, which can be received from the communication device (e.g., 102). Based at least in part on the analysis results, the distribution management component 126 can determine which cell (e.g., a qualifying cell) has the smallest level of resource utilization, as compared to the other cells (e.g., other qualifying cells), and can select that cell as the best cell for connection with the device. In some implementations, the distribution management component 126 can decide to consider only qualifying cells of the respective cells (e.g., 118, 120, 122, ... ), wherein qualifying cells can be those cells that have signal conditions (e.g., signal qualities, signal strengths) that satisfy a minimum threshold signal condition, and, from the qualifying cells, can determine and select the qualifying cell that has the smallest level of resource utilization relative to the levels of resource utilization of the other qualifying cells. The distribution management component 126 can determine whether to redirect the communication device (e.g., 102) from the source cell (e.g., 118) to a target cell (e.g., 120), based at least in part on the which cell is determined to be the best cell (e.g., whether the source cell or target cell is the best cell), as more fully described herein.

In certain embodiments, the defined distribution management criteria can relate to determining which cell of the respective cells (e.g., 118, 120, 122, ... ) (or a subset of qualifying cells) is the most desirable (e.g., best) cell to which the communication device (e.g., 102) is to be connected based at least in part on the respective average number of communication devices connected to the respective cells. For instance, the distribution management component 126 can determine the respective average number of communication devices connected to the respective cells based at least in part on the results of analyzing the respective performance indicator information of the respective cells. The distribution management component 126 also can determine respective signal conditions (e.g., signal qualities, signal strengths) associated with the respective cells (e.g., 118, 120, 122, ... ) based at least in part on the results of analyzing the respective signal condition information, which can be received from the communication device (e.g., 102). Based at least in part on the analysis results, the distribution management component 126 can determine which cell (e.g., a qualifying cell) has the smallest average number of communication devices connected to it, as compared to the average communication device numbers of the other cells (e.g., other qualifying cells), and can select that cell as the best cell for connection with the communication device (e.g., 102). In some implementations, the distribution management component 126 can decide to consider only qualifying cells (e.g., a subset of qualifying cells) of the respective cells (e.g., 118, 120, 122, . . . ), wherein qualifying cells can be those cells that have signal conditions (e.g., signal qualities, signal strengths) that satisfy a minimum threshold signal condition, and, from the qualifying cells, can determine and select the qualifying cell that has the smallest average number of communication devices connected to it relative to the average communication device numbers of the other qualifying cells.

With further regard to the communication network 108, the communication network 108 can comprise a macro communication network and/or a micro communication network. The macro communication network can be, can comprise, or can be associated with a core network, a cellular network, an IP-based network, Wi-Fi, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Gi-Fi, Hi-Fi, Bluetooth, ZigBee, etc., and/or can be associated with (e.g., connected to) the macro communication network. The micro communication network can be or can comprise, for example a local area network (LAN), that can facilitate connecting certain devices (e.g., communication devices) associated with the micro communication network to each other and/or to the macro communication network.

Respective communication devices (e.g., 102, 104, 106, . . . ) can be associated with (e.g., communicatively connected to) the communication network 108 via a wireless communication connection or a wireline (e.g., wired) communication connection (e.g., via a cell (e.g., 118, 120, 122, . . . ) and associated base station (e.g., 112, 114, 116, . . . )). The respective communication devices (e.g., 102, 104, 106, . . . ) can operate and communicate in a communication network environment. At various times, a communication device (e.g., 102, 104, 106, . . . ) can be communicatively connected via a wireless communication connection(s) to one or more radio access networks (RANs) (e.g., 110), which can comprise one or more base stations (e.g., 112, 114, 116, . . . ) to communicatively connect the communication device to the communication network 108 to enable the communication device to communicate other communication devices associated with (e.g., communicatively connected to) the communication network 108 in the communication network environment. The one or more RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 108 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 108 (e.g., a core network, cellular network, or a network comprising a core network, cellular network, and/or an IP-based network) can facilitate routing voice and data communications between a communication device(s) (e.g., 102, 104, or 106, . . . ) and another communication device associated with the communication network 108 in the communication network environment. The communication network 108 also can allocate resources to the communication devices in the communication network 108, convert or enforce protocols, establish and enforce quality of service (QOS) for the communication devices, provide applications or services in the communication network 108, translate signals, and/or perform other desired functions to facilitate system interoperability and communication in the communication network 108 (e.g., wireless portion of the communication network 108 or wireline portion of the communication network 108). The communication network 108 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., communication devices 102) is moved through a wireless communication network environment, at various times, the communication device(s) can be connected (e.g., wirelessly connected) to one of a plurality of base stations or APs (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., base station 112) can serve a specified coverage area to facilitate communication by the communication device(s) (e.g., 102) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) (e.g., 102) located in the respective area covered by the respective cell, where such coverage can be achieved via a wireless link (e.g., uplink (UL), downlink (DL)). When an attachment attempt is successful, the communication device(s) (e.g., 102) can be served by the AP and incoming voice and data traffic can be paged and routed to the communication device(s) (e.g., 102) through the AP, and outgoing voice and data traffic from the communication device(s) (e.g., 102) can be paged and routed through the AP to other communication devices in the communication network environment. In an aspect, the communication device(s) (e.g., 102) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

Figure 4:
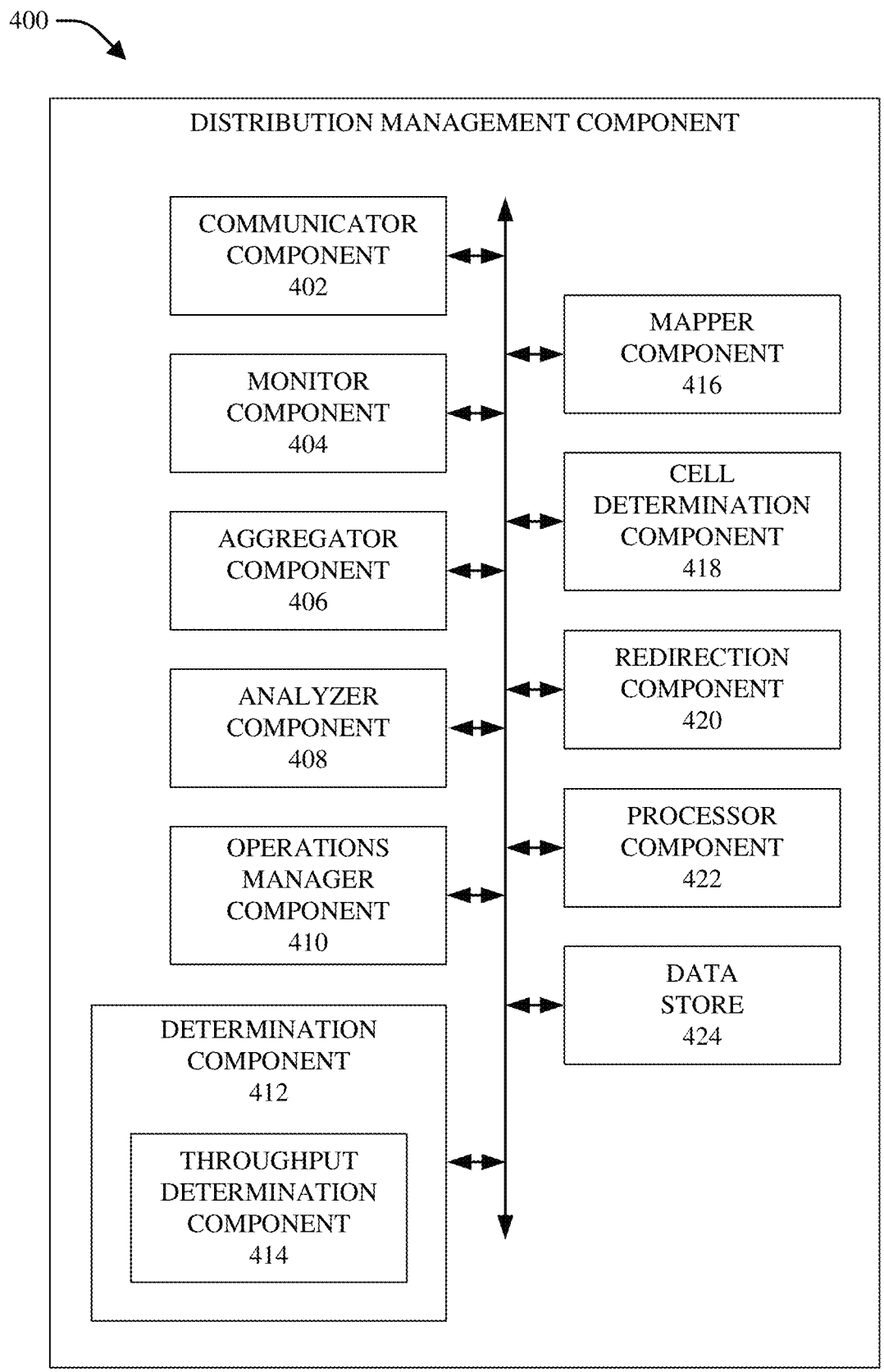
FIG. 4 illustrates a block diagram of an example distribution management component, in accordance with various aspects and embodiments of the disclosed subject matter.

FIG. 4 depicts a block diagram of an example distribution management component 400, in accordance with various aspects and embodiments of the disclosed subject matter. In some embodiments, the distribution management component 400 can be part of or associated with a base station associated with the communication network. The distribution management component 400 can comprise, for example, a communicator component 402, a monitor component 404, an aggregator component 406, an analyzer component 408, an operations manager component 410, a determination component 412, a throughput determination component 414, a mapper component 416, a cell determination component 418, a redirection component 420, a processor component 422, and a data store 424.

The communicator component 402 can transmit information from the distribution management component 400 to another component(s) or device(s) (e.g., communication device, network component or device, . . . ) and/or can receive information from the other component(s) or device(s). For instance, the communicator component 402 can receive information relating to respective signal conditions (e.g., signal qualities, signal strengths, . . . ) of cells with respect to a communication device from the communication device, respective cell-related information (e.g., respective performance indicators, characteristics, . . . ) from respective cells, mode-related information (e.g., information indicating a communication device is in an idle mode or a connected mode), and/or other desired information. The communicator component 402 also can transmit commands to have communication devices perform measurements of signal conditions with respect to cells, and/or can transmit information (e.g., target cell-related information) that can facilitate discontinuing a connection (e.g., an RRC connection) with a first cell (e.g., source cell), redirecting the communication device from the first cell to a second cell (e.g., target cell), and enabling the communication device to identify and send a connection request to the second cell.

The monitor component 404 can monitor, track, and obtain information relating to traffic communication and distribution associated with respective communication devices and respective cells or carriers of a sector or other area of the communication network; can monitor, track, and obtain information relating to respective signal conditions of cells with respect to respective communication devices; can monitor, track, and obtain cell-related information (e.g., performance indicators, characteristics, . . . ) from the respective cells; and/or can monitor track, and obtain information relating to respective resource utilization associated with the respective cells or carriers.

The aggregator component 406 can aggregate data received (e.g., obtained) from various entities (e.g., communication devices, cells, monitor component 404 or another component(s) of the distribution management component 400, application, processor, data store, . . . ). The aggregator component 406 can correlate respective items of data based at least in part on type of data (e.g., respective cell-related information received from respective cells, respective measurement reports comprising respective signal condition information relating to respective cells and/or communication devices, . . . ), source (e.g., a communication device, a cell, . . . ) of the data, time or date the data was generated or received, etc., to facilitate analyzing of the data by the analyzer component 408. For example, the aggregator component 406 can aggregate data relating to respective signal conditions for respective cells with respect to a communication device and respective cell-related information of the respective cells to facilitate determining which cell of the respective cells is the best cell for the communication device to connect to and/or to facilitate redirecting (if and as appropriate) the communication device from a source cell to a target cell (e.g., when the target cell is determined to be the best cell), as more fully described herein.

The analyzer component 408 can analyze information and can generate analysis results based at least in part on the results of the analysis. For example, the analyzer component 408 can analyze information relating to signal quality (e.g., RSRQ) of a signal (e.g., reference signal) for a cell with respect to a communication device and an activity factor (e.g., subcarrier activity factor Q) associated with the cell to facilitate determining (e.g., calculating) a SINR value for the cell with respect to the communication device, as more fully described herein. As another example, the analyzer component 408 can analyze information relating to the spectral efficiency associated with a cell and communication device, and a bandwidth and activity factor associated with the cell, to facilitate determining a throughput value for the cell with respect to the communication device, as more fully described herein.

The operations manager component 410 can control (e.g., manage) operations associated with the distribution management component 400. For example, the operations manager component 410 can facilitate generating instructions to have components of the distribution management component 400 perform operations, and can communicate respective instructions to respective components (e.g., communicator component 402, monitor component 404, aggregator component 406, analyzer component 408, . . . ) of the distribution management component 400 to facilitate performance of operations by the respective components of the distribution management component 400 based at least in part on the instructions, in accordance with the defined distribution management criteria and the defined distribution management algorithm(s). The operations manager component 410 also can facilitate controlling data flow between the respective components of the distribution management component 400 and controlling data flow between the distribution management component 400 and another component(s) or device(s) (e.g., communication device, base station or other component or device of the communication network) associated with (e.g., connected to) the distribution management component 400.

The determination component 412 can perform various determinations and calculations based at least in part on analysis results generated by the analyzer component 408 or determination component 412, in accordance with the defined distribution management criteria and the defined distribution management algorithm(s). For example, the determination component 412 can determine or calculate (e.g., in conjunction with the analyzer component 408) a SINR value for a cell with respect to a communication device based at least in part on a signal quality (e.g., RSRQ) of a signal for the cell with respect to the communication device and an activity factor (e.g., Q) associated with the cell (e.g., in accordance with Equation (1)), as more fully described herein. As another example, for each cell of a group of cells, the determination component 412 can employ the throughput determination component 414 to determine or calculate (e.g., in conjunction with the analyzer component 408) a throughput value for the cell with respect to a communication device based at least in part on (e.g., as a function of) a spectral efficiency associated with the cell and communication device, and a bandwidth and activity factor associated with the cell (e.g., in accordance with Equation (2)), as more fully described herein.

The mapper component 416 can map or can comprise a mapping of SINR values to spectral efficiency values (e.g., spectral efficiency values in bps/Hz). For instance, the mapper component 416 can map or can comprise a mapping of SINR values to spectral efficiency values, wherein the mapping can be determined (e.g., by the mapper component 416 and/or another component) based at least in part on field measurement data and/or validated simulation data relating to SINR values and spectral efficiency values (e.g., field measurement data and/or validated simulation data that can indicate a relationship(s) between respective SINR values and respective spectral efficiency values).

The cell determination component 418 can determine which cell is the best cell of the respective cells for a communication device to connect to, in accordance with the defined distribution management criteria. In some embodiments, based at least in part on the respective throughput values for respective cells with respect to the communication device (e.g., as determined by the determination component 412), the cell determination component 418 can determine which cell is the best cell of the respective cells for the communication device to connect to, in accordance with the defined distribution management criteria. For example, the cell determination component 418 can determine that the cell that has the best (e.g., highest) throughput value (and/or determine that the cell is a qualifying cell) as compared to (e.g., relative to) the throughput values of the other cells (or other qualifying cells), in accordance with the defined distribution management criteria (e.g., wherein a qualifying cell can be a cell that has a signal condition(s) (e.g., signal quality or signal strength) that satisfies (e.g., meets or exceeds) a minimum threshold signal condition).

The redirection component 420 can redirect a communication device from a source cell to a target cell, in response to a determination (e.g., by the cell determination component 418) that the target cell is the best cell for the communication device to connect to, in accordance with the defined distribution management criteria. The redirection component 420 can generate a redirect message, and can communicate (e.g., via the communicator component 402) the redirect message to the communication device to facilitate releasing the connection (e.g., RRC connection) between the source cell and communication device, and redirecting the communication device to the target cell. The redirect message also can include target cell-related information (e.g., target cell identifier, target cell parameters, . . . ) that can facilitate identification of the target cell and/or target cell parameters by the communication device, wherein, using the target-cell information, the communication device can generate a connection request, and can communicate the connection request to the target cell to facilitate establishing a connection (e.g., RRC connection) to the target cell.

The processor component 422 that can work in conjunction with the other components (e.g., communicator component 402, monitor component 404, aggregator component 406, analyzer component 408, operations manager component 410, determination component 412, throughput determination component 414, mapper component 416, cell determination component 418, redirection component 420, and data store 424) to facilitate performing the various functions of the distribution management component 400. The processor component 422 can employ one or more processors, microprocessors, or controllers that can process data, such as information relating to traffic and traffic distribution, signal conditions of cells with respect to communication devices, cell-related information (e.g., performance indicators, cell characteristics), throughputs of respective cells with respect to a communication device, spectral efficiency values, SINR values, mappings (e.g., mapping of SINR values to spectral efficiency values), resource utilization of cells, load balancing of traffic, parameters, traffic flows, policies, defined distribution management criteria, algorithms (e.g., defined distribution management algorithm(s), defined throughput algorithm(s)), protocols, interfaces, tools, and/or other information, to facilitate operation of the distribution management component 400, as more fully disclosed herein, and control data flow between the distribution management component 400 and other components (e.g., communication devices, base stations, cells, other network devices of the communication network, data sources, applications) associated with the distribution management component 400.

The data store 424 that can store data structures (e.g., user data, metadata), code structure(s) (e.g., modules, objects, hashes, classes, procedures) or instructions, information relating to traffic and traffic distribution, signal conditions of cells with respect to communication devices, cell-related information (e.g., performance indicators, cell characteristics), throughputs of respective cells with respect to a communication device, spectral efficiency values, SINR values, mappings (e.g., mapping of SINR values to spectral efficiency values), resource utilization of cells, load balancing of traffic, parameters, traffic flows, policies, defined distribution management criteria, algorithms (e.g., defined distribution management algorithm(s), defined throughput algorithm(s)), protocols, interfaces, tools, and/or other information, to facilitate controlling operations associated with the distribution management component 400. In an aspect, the processor component 422 can be functionally coupled (e.g., through a memory bus) to the data store 424 in order to store and retrieve information desired to operate and/or confer functionality, at least in part, to the communicator component 402, monitor component 404, analyzer component 408, operations manager component 410, determination component 412, throughput determination component 414, mapper component 416, cell determination component 418, redirection component 420, and data store 424, etc., and/or substantially any other operational aspects of the distribution management component 400.

Figure 5:
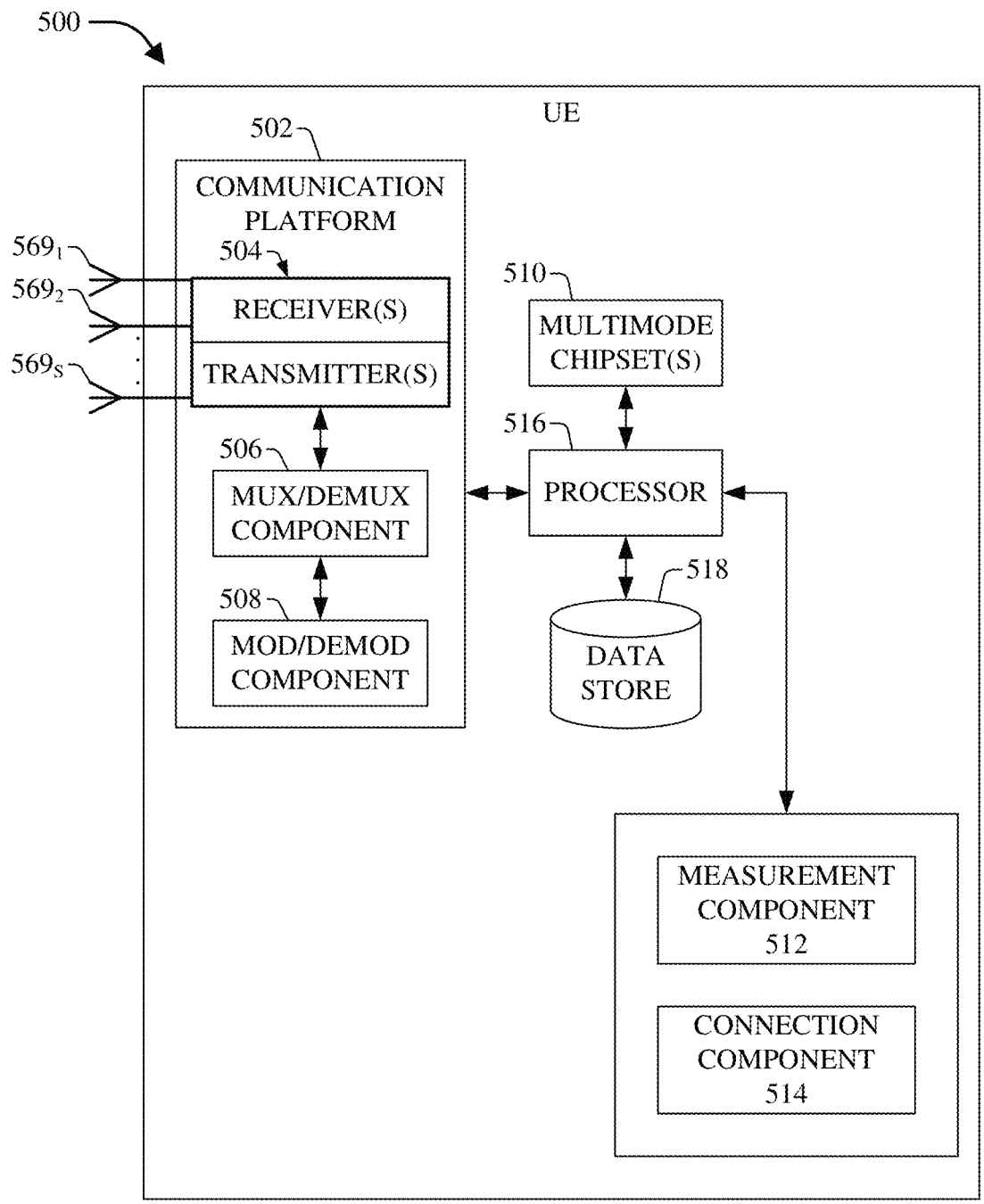
FIG. 5 presents a block diagram of an example user equipment (UE), in accordance with various aspects and embodiments of the disclosed subject matter.

FIG. 5 depicts a block diagram of an example UE 500 in accordance with various aspects and embodiments of the disclosed subject matter. In accordance with various embodiments, the UE 500 (e.g., communication device) can be a multimode access terminal, wherein a set of antennas $569_1$-$569_S$ (S can be a positive integer) can receive and transmit signal(s) from and to wireless devices like access points, access terminals, wireless ports and routers, and so forth, that operate in a radio access network. It should be appreciated that antennas $569_1$-$569_S$ can be a part of communication platform 502, which comprises electronic components and associated circuitry that provide for processing and manipulation of received signal(s) and signal(s) to be transmitted; e.g., receivers and transmitters 504, multiplexer/demultiplexer (mux/demux) component 506, and modulation/demodulation (mod/demod) component 508.

In some implementations, the UE 500 can include a multimode operation chipset(s) 510 that can allow the UE 500 to operate in multiple communication modes in accordance with disparate technical specification for wireless technologies. In an aspect, multimode operation chipset(s) 510 can utilize communication platform 502 in accordance with a specific mode of operation (e.g., voice, global positioning system (GPS), . . . ). In another aspect, multimode operation chipset(s) 510 can be scheduled to operate concurrently (e.g., when S>1) in various modes or within a multitask paradigm.

The UE 500 can comprise a measurement component 512 that can measure signal conditions (e.g., signal qualities, signal strengths, signal power, . . . ) and/or other characteristics of the UE 500 with respect to cells, as more fully described herein. The UE 500, via the communication platform 502, can communicate information relating to the measurements of the signal conditions and/or other characteristics to the distribution management component, base station, and/or another desired component or device. Such measurements and/or the communication of information relating to such measurements can be performed by the UE 500, for example, automatically or dynamically, or in response to a command from the distribution management component, base station, or other component or device associated with the communication network.

A connection component 514 can generate a connection request to connect to a desired cell. For instance, the connection component 514 can generate a connection request to connect to a cell (e.g., a source cell), wherein the connection request can be communicated to the cell via a transmitter (e.g., 504) and the set of antennas $569_1$-$569_S$. If the UE 500 is redirected from a source cell to a target cell, the connection component 514 can generate, for transmission to the target cell, a connection request to request connection to the target cell (e.g., based at least in part on target cell-related information received from the distribution management component or source cell).

The UE 500 also can include a processor(s) 516 that can be configured to confer functionality, at least in part, to substantially any electronic component within the UE 500, in accordance with aspects of the disclosed subject matter. For example, the processor(s) 516 can facilitate enabling the UE 500 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 516 can facilitate enabling the UE 500 to process data relating to messaging, voice calls, or other services (e.g., Internet services or access, interactive services relating to an information presentation, etc.); information relating to measurements of signal conditions with respect to cells; information relating to cells to facilitate connection to a source cell or target cell; information relating to parameters (e.g., UE parameters, network-related parameters); information relating to connection modes (e.g., idle mode, connected mode); and/or other data.

The UE 500 also can contain a data store 518 that can store data structures (e.g., user data, metadata); code structure(s) (e.g., modules, objects, classes, procedures) or instructions; message hashes; neighbor cell list; one or more lists (e.g., whitelist, etc.); information relating to measurements of signal conditions with respect to cells; information relating to cells to facilitate connection to a source cell or target cell; information relating to parameters (e.g., UE parameters, network-related parameters); information relating to connection modes (e.g., idle mode, connected mode); UE identifier; information relating to voice calls, messaging, or other services associated with the UE 500; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 516 can be functionally coupled (e.g., through a memory bus) to the data store 518 in order to store and retrieve information (e.g., neighbor cell list; measurement-related information; cell-related information; parameter information; connection-mode information; information relating to messaging, voice calls, or other services (e.g., interactive services); frequency offsets; desired algorithms; security code; UE identifier; . . . ) desired to operate and/or confer functionality, at least in part, to communication platform 502, multimode operation chipset(s) 510, measurement component 512, connection component 514, and/or substantially any other operational aspects of the UE 500.

Figure 6:
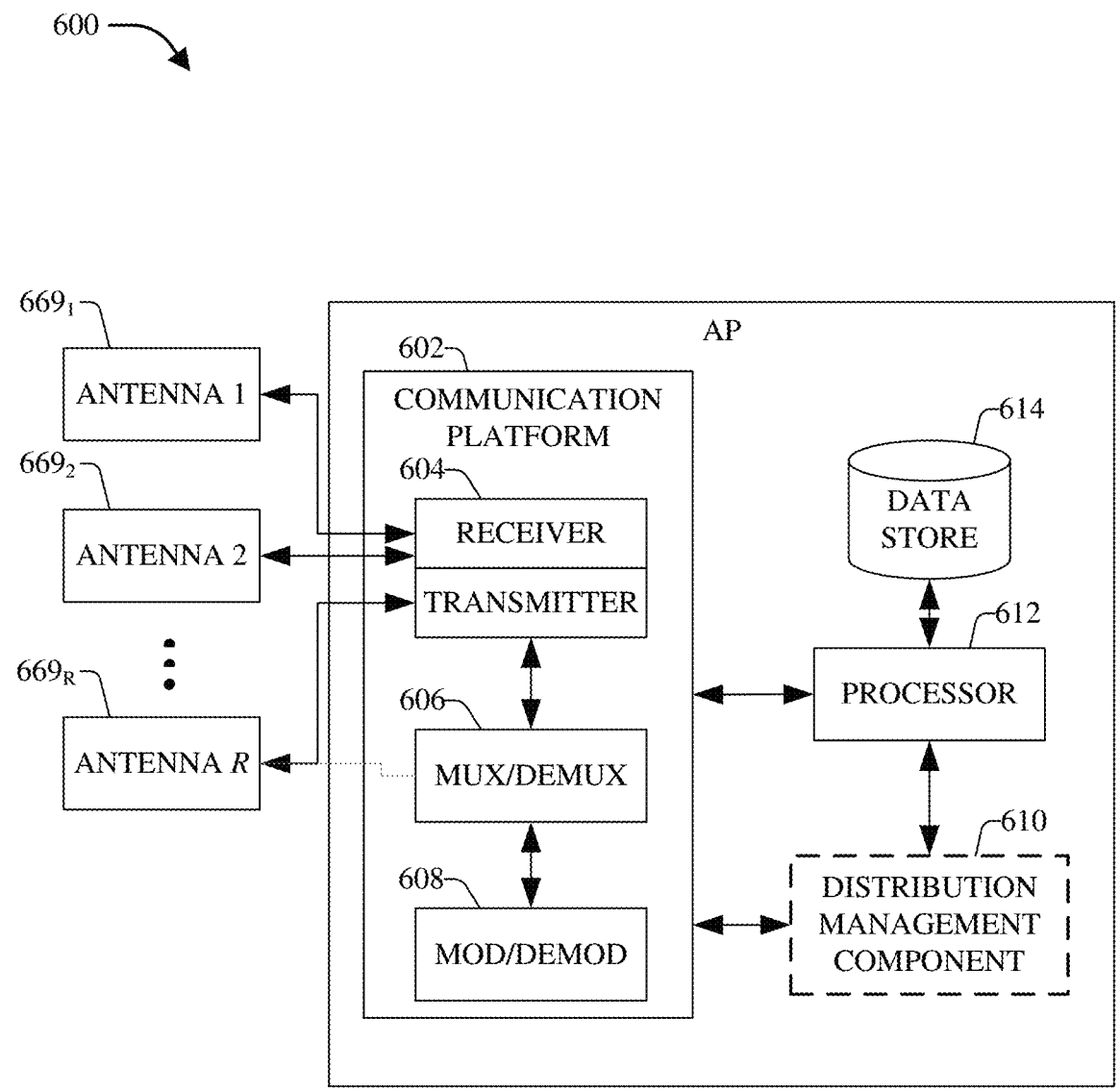
FIG. 6 depicts a block diagram of an example access point (AP), in accordance with various aspects and embodiments of the disclosed subject matter.

FIG. 6 illustrates a block diagram of an example AP 600 (e.g., macro base station, femto AP, pico AP, Wi-Fi AP, Wi-Fi-direct AP, . . . ), in accordance with various aspects and embodiments of the disclosed subject matter. The AP 600 can receive and transmit signal(s) from and to wireless devices like access points (e.g., base stations, femtocells, picocells, . . . ), access terminals (e.g., UEs), wireless ports and routers, and the like, through a set of antennas $669_1$-$669_R$ (wherein R can be a positive integer). In an aspect, the antennas $669_1$-$669_R$ can be a part of a communication platform 602, which comprises electronic components and associated circuitry that can provide for processing and manipulation of received signal(s) and signal(s) to be transmitted. In an aspect, the communication platform 602 can include a receiver/transmitter 604 that can convert signal from analog to digital upon reception, and from digital to analog upon transmission. In addition, receiver/transmitter 604 can divide a single data stream into multiple, parallel data streams, or perform the reciprocal operation.

In an aspect, coupled to receiver/transmitter 604 can be a multiplexer/demultiplexer (mux/demux) 606 that can facilitate manipulation of signal in time and frequency space. The mux/demux 606 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 606 can scramble and spread information (e.g., codes) according to substantially any code known in the art, e.g., Hadamard-Walsh codes, Baker codes, Kasami codes, polyphase codes, and so on. A modulator/demodulator (mod/demod) 608 also can be part of the communication platform 602, and can modulate information according to multiple modulation techniques, such as frequency modulation, amplitude modulation (e.g., M-ary quadrature amplitude modulation (QAM), wherein M can be a positive integer), phase-shift keying (PSK), and the like.

In some embodiments, the AP 600 optionally can include a distribution management component 610 (e.g., integrated or otherwise associated with the AP 600), that can facilitate desirably controlling and enhancing distribution of traffic associated with communication devices among the cells of the communication network and resource utilization by the cells of the communication network, in accordance with the defined distribution management criteria, as more fully described herein. For instance, the distribution management component 610 can determine which cell of a group of cells is the best cell to which a communication device is to be connected to achieve desirable (e.g., improved, optimal, or acceptable) load balancing in the communication network, enhance user experience of the user of the communication device, and enhance overall performance of the communication network, in accordance with the defined distribution management criteria, as more fully described herein.

The AP 600 also can comprise a processor(s) 612 that can be configured to confer and/or facilitate providing functionality, at least partially, to substantially any electronic component in or associated with the AP 600. For instance, the processor(s) 1212 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 612 also can facilitate other operations on data, for example, to facilitate managing distribution of traffic associated with communication devices, determining which cell of a group of cells is the best cell to which a communication device is to connect, redirecting a communication device from a source cell to a target cell (e.g., when the target cell is determined to be the best cell), resource utilization for cells in a communication network, adjustment of parameters associated with managing traffic distribution and resource utilization, etc.

In another aspect, the AP 600 can include a data store 614 that can store data structures; code instructions; rate coding information; information relating to measurements of signal conditions for cells with respect to communication devices or reception of information related thereto; information relating to managing distribution of traffic associated with communication devices; information relating to establishing a communication connection between a communication device (e.g., UE) and another communication device(s); information relating to determining which cell of a group of cells is the best cell to which a communication device is to connect; information relating to redirecting a communication device from a source cell to a target cell (e.g., when the target cell is determined to be the best cell); information relating to traffic distribution among cells and connection of communication devices to cells, information relating to resource utilization by cells, information relating to parameters associated with managing traffic distribution and resource utilization, information relating to algorithms (e.g., defined distribution management algorithm(s), defined throughput algorithm(s)); information relating to distribution management criteria; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 612 can be coupled to the data store 614 in order to store and retrieve information (e.g., information, such as algorithms, relating to multiplexing/demultiplexing or modulation/demodulation, information relating to signal conditions, information relating to establishing communication connections associated with a communication device(s) served by the AP 600, information relating to managing distribution of traffic associated with communication devices and resource utilization of cells, information relating to determining which cell of a group of cells is the best cell to which a communication device is to connect, information relating to redirecting a communication device from a source cell to a target cell, information relating to the white list, . . . ) desired to operate and/or confer functionality to the communication platform 602, the distribution management component 610, and/or other operational components of AP 600.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
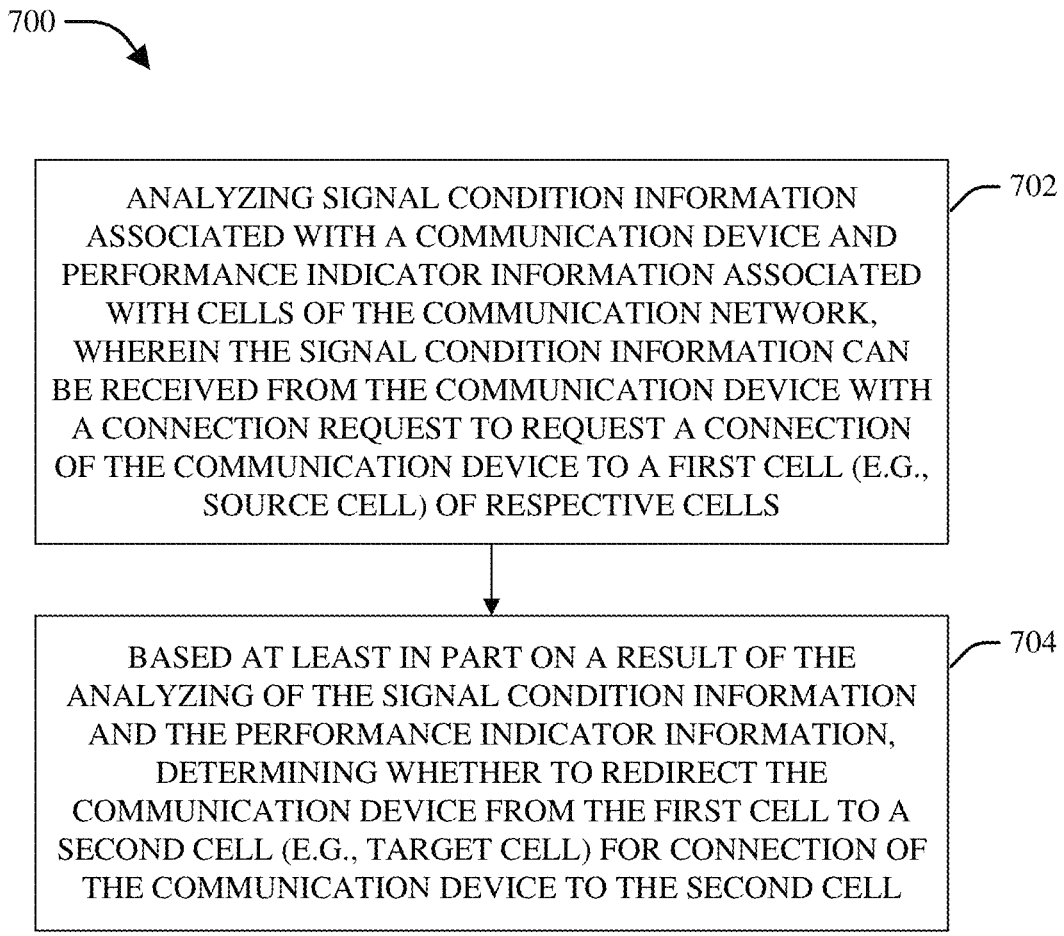
FIG. 7 illustrates a flow chart of an example method that can determine whether to redirect a device from a first cell to a second cell to facilitate controlling distribution of traffic and load balancing in a communication network, in accordance with various aspects and embodiments of the disclosed subject matter.
Figure 8:
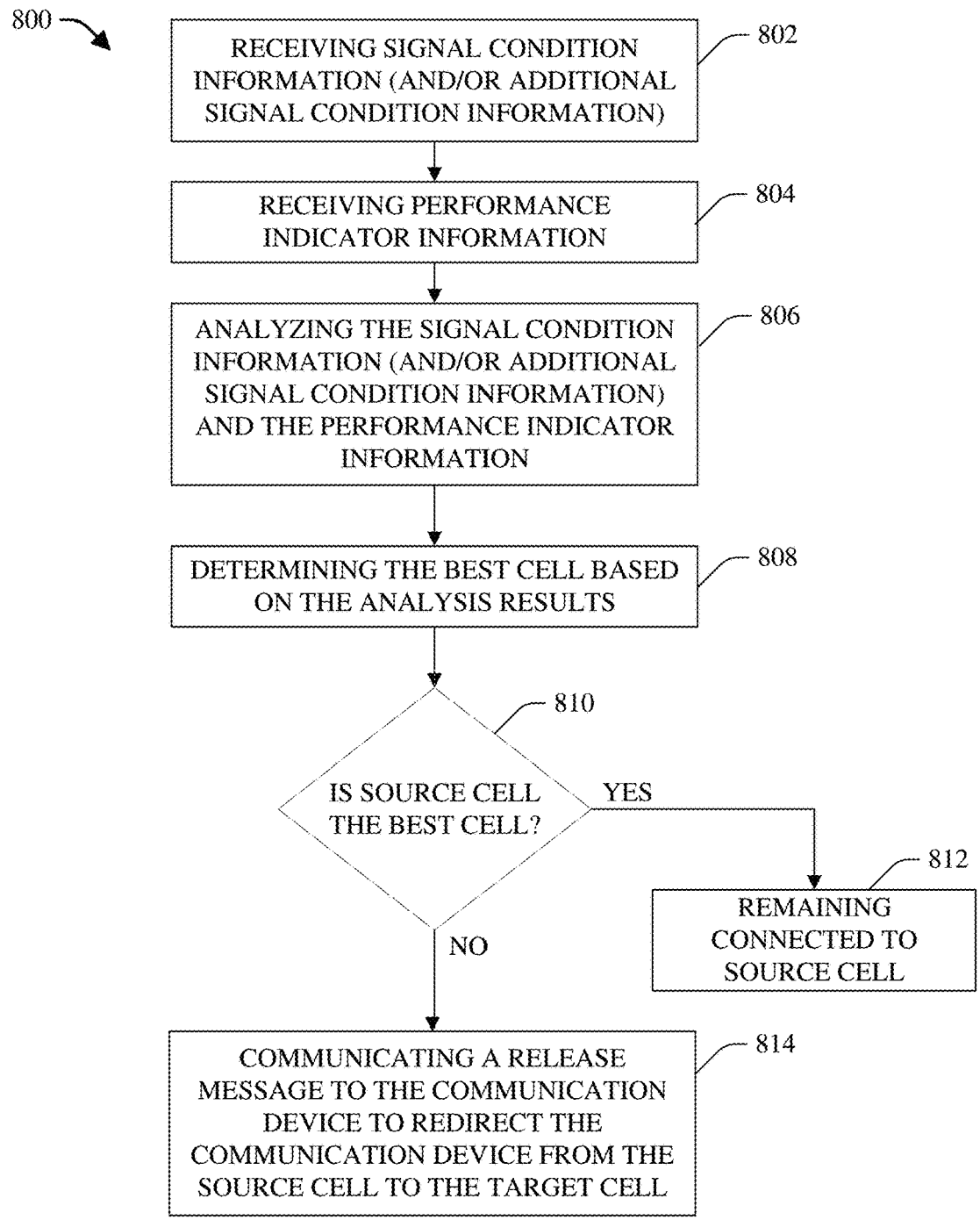
FIG. 8 presents a flow chart of another example method that can determine whether to redirect a communication device from a first cell to a second cell to facilitate controlling distribution of traffic and load balancing in a communication network, in accordance with various aspects and embodiments of the disclosed subject matter.
Figure 9:
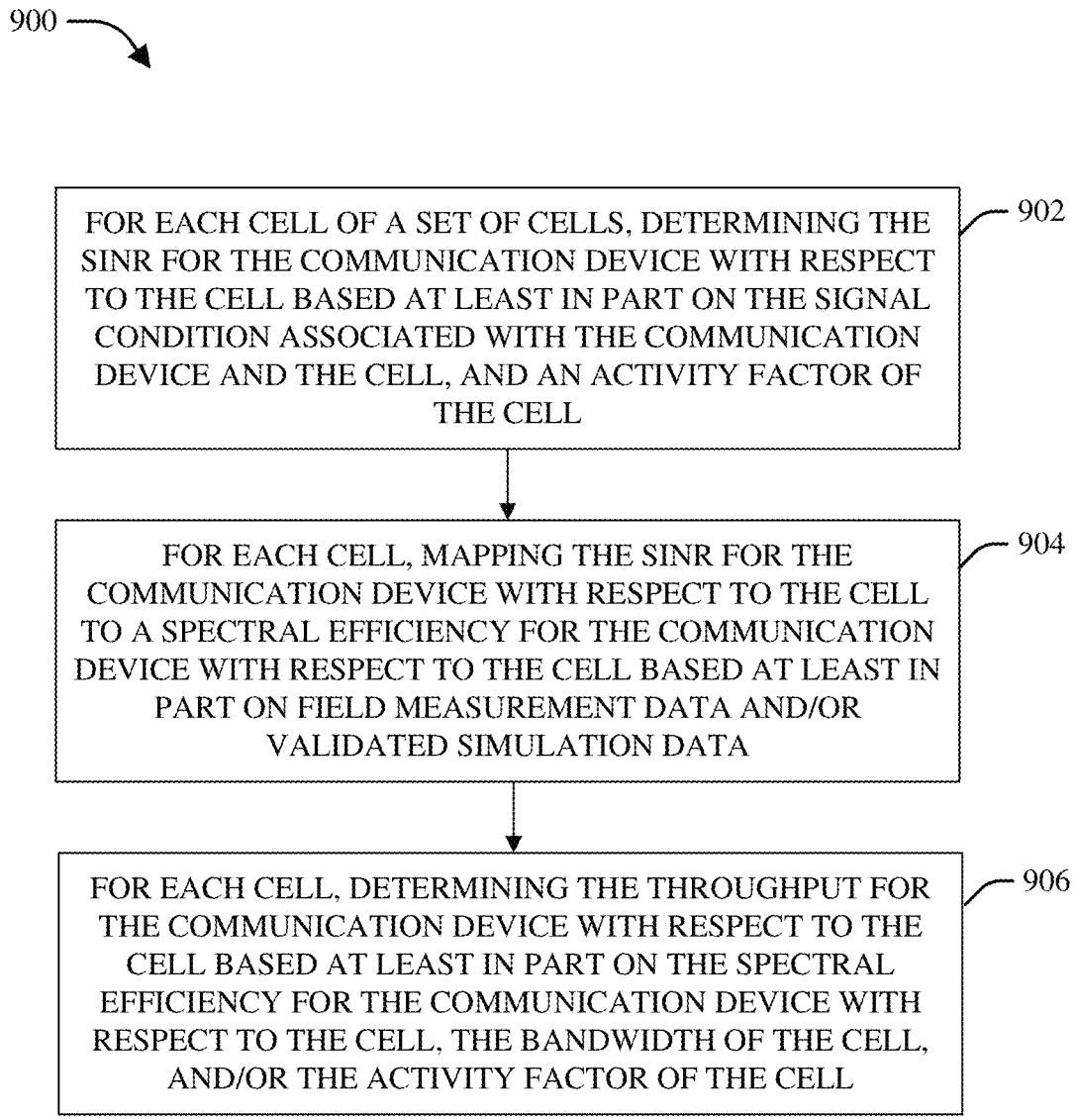
FIG. 9 depicts a flow chart of an example method that can determine throughputs for a communication device with respect to cells to facilitate determining whether to redirect the communication device from a first cell to a second cell to facilitate controlling distribution of traffic and load balancing in a communication network, in accordance with various aspects and embodiments of the disclosed subject matter.

In view of the example systems and/or devices described herein, example methods that can be implemented in accordance with the disclosed subject matter can be further appreciated with reference to flowcharts in FIGS. 7-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 7 illustrates a flow chart of an example method 700 that can determine whether to redirect a device from a first cell to a second cell to facilitate controlling distribution of traffic and load balancing in a communication network, in accordance with various aspects and embodiments of the disclosed subject matter. The method 700 can be employed by, for example, a distribution management component of the communication network. In some embodiments, the distribution management component can be part of a RAN (e.g., C-RAN).

At 702, signal condition information (e.g., signal quality or signal strength information) associated with a communication device and performance indicator information associated with cells of the communication network can be analyzed, wherein the signal condition information can be received from the communication device along with a connection request to request a connection of the communication device to a first cell (e.g., source cell) of respective cells. The distribution management component can receive a connection request and the signal condition information from the communication device, wherein, while the device is in idle mode, the communication device can perform the signal condition measurements (e.g., signal quality or strength measurements) to generate the signal condition information that can represent the respective signal conditions of the respective cells. The signal condition information can relate to respective signal qualities, signal strengths, or other signal conditions between the communication device and the respective cells.

The distribution management component also can obtain or access the performance indicator information associated with the cells, wherein the performance indicator information can be collected by the RAN (e.g., collected by the distribution management component of a C-RAN), which can be associated with (e.g., communicatively connected to) the cells. The performance indicator information can relate to respective performance indicators of the respective cells.

The distribution management component can analyze the signal condition information associated with the communication device and cells, and the performance indicator information associated with the cells, to facilitate determining whether the communication device is to be redirected from the first cell to the second cell for connection of the communication device to the second cell, or is to remain connected to the first cell. In some embodiments, after the communication device has sent the signal condition information with the connection request to the distribution management component (e.g., to the source cell associated with the distribution management component), the communication device can perform additional measurements of signal conditions with respect to the cells and can communicate the additional signal condition information to the distribution management component for analysis with the signal condition information and the performance indicator information. In the meantime, the communication device can be connected, or at least initially connected, to the first cell (e.g., source cell). In certain embodiments, the communication device can be connected to the first cell, wherein the information analysis and determination regarding whether to redirect the communication device from the first cell to a second cell (e.g., target cell) can be performed before a data transmission is performed between the device and first cell and/or before the first cell has allocated resources (e.g., network resources used to transmit or facilitate transmission of data) to the communication device.

The distribution management component can analyze such information (e.g., signal condition information, performance indicator information, and/or additional signal condition information) to determine which cell of the respective cells is the best cell to which the communication device is to be connected to achieve desirable (e.g., improved, optimal, or acceptable) load balancing in the communication network, enhance user experience of the user of the communication device, and enhance performance of the communication network, in accordance with the defined distribution management criteria. The defined distribution management criteria can relate to, for example, which cell can provide the best (e.g., highest) throughput of traffic for the communication device, which cell has the smallest amount of resource utilization, or which cell has the smallest average number of communication devices connected to it.

At 704, based at least in part on a result of the analyzing of the signal condition information and the performance indicator information, a determination can be made regarding whether to redirect the communication device from the first cell to a second cell (e.g., target cell) for connection of the communication device to the second cell. The distribution management component can determine whether to redirect the communication device from the first cell to the second cell for connection of the communication device to the second cell, based at least in part on a result of the analyzing of the signal condition information and the performance indicator information, in accordance with the defined distribution management criteria.

If the distribution management component determines that the communication device is to be redirected to the second cell, the distribution management component can facilitate releasing the connection between the communication device and the first cell and can communicate cell-related information (e.g., target cell-related information) regarding the second cell to the communication device to notify the communication device that it is being redirected to the second cell and provide information regarding the second cell to the communication device to facilitate enabling the communication device to contact the second cell and request a connection to the second cell.

FIG. 8 presents a flow chart of another example method 800 that can determine whether to redirect a communication device from a first cell to a second cell to facilitate controlling distribution of traffic and load balancing in a communication network, in accordance with various aspects and embodiments of the disclosed subject matter. The method 800 can be employed by, for example, a distribution management component of or associated with the communication network and/or a source cell of the communication network. In some embodiments, the distribution management component can be part of a RAN (e.g., C-RAN).

At 802, signal condition information (and/or additional signal condition information) can be received. The distribution management component can receive the signal condition information (and/or the additional signal condition information) from the communication device, wherein the signal condition information can relate to signal qualities, signal strengths, or other type of signal conditions of signals from cells associated with the communication device.

For instance, while the communication device is in idle mode, the communication device can measure signal conditions (e.g., signal qualities, signal strengths, . . . ) of signals from cells associated with (e.g., in sufficiently close proximity to) the communication device. The communication device can communicate the signal condition information relating to the signal conditions of the cells to the source cell in connection with a connection request to the source cell to request establishing a connection to the source cell. The source cell can establish a connection (e.g., a communication connection, such as an RRC connection) between the source cell and the communication device. In some embodiments, in the meantime, the communication device can perform further measurements of signal conditions of signals from the cells and can communicate the additional signal condition information relating to the further measurements to the source cell. The distribution management component can receive or access the signal condition information and/or the additional signal condition information.

At 804, performance indicator information can be received. The distribution management component can receive the performance indicator information from the cells. Respective cells can communicate respective performance indicator information to the distribution management component. The respective performance indicator information can relate to respective performance indicators (e.g., KPIs) of the respective cells, wherein the respective performance indicators can comprise, for example, the respective bandwidths of the respective cells, the respective activity factors (e.g., respective subcarrier activity factors) or congestion levels of the respective cells, and/or one or more other types of performance indicators.

At 806, the signal condition information (and/or additional signal condition information) and the performance indicator information can be analyzed. The distribution can analyze the signal condition information, the additional signal condition information, and/or the performance indicator information to facilitate determining which cell of the cells is the most desirable (e.g., best, optimal, most acceptable) cell to which the communication device is to be connected.

At 808, based at least in part on the results of the analysis, the best cell of the cells can be determined for connection with the communication device, in accordance with the defined distribution management criteria. The distribution management component can determine which cell of the cells is the best cell to which the communication device is to be connected, based at least in part on the results of the analysis, in accordance with the defined distribution management criteria. The defined distribution management criteria can relate to identifying the cell of the cells that can have the best (e.g., highest) throughput with the communication device, as compared to the other cells; identifying the cell of the cells that can have the smallest resource utilization, as compared to the other cells; identifying the cell of the cells that can have the smallest average number of communication devices connected to it, as compared to the other cells; and/or can identify the cell of the cells that can be considered the best cell for connection to the communication device, as compared to the other cells, using any other desired distribution management criterion (or criteria).

In some embodiments, to facilitate determining a best cell to which the communication device is to be connected, the distribution management component can determine (e.g., determine, calculate, or estimate) respective SINRs associated with the communication device and respective cells, respective spectral efficiency values associated with the communication device and the respective cells, and/or respective throughput values associated with the communication device and respective cells, based at least in part on the results of the analyzing of the signal quality information (and/or additional signal quality information) and/or the performance indicator information (e.g., activity factor, bandwidth, . . . ), as more fully described herein. For instance, the distribution management component can determine the respective SINRs of respective cells based at least in part on (e.g., as a function of) the respective signal conditions (e.g., signal qualities) and respective activity factors (e.g., subcarrier activity factors) associated with the respective cells, for example, as more fully described herein. The distribution management component can determine the respective spectral efficiencies associated with the respective cells based at least in part on (e.g., as a function of) the respective SINRs associated with the respective cells and field measurement data and/or validated simulation data, for example, as more fully described herein. The distribution management component can determine the respective throughputs associated with the respective cells, with respect to the communication device, based at least in part on (e.g., as a function of) the respective spectral efficiencies, respective bandwidths, and respective activity factors associated with the respective cells, for example, as more fully described herein.

The distribution management component can determine or facilitate determining which cell of the cells is the most desirable (e.g., best) cell to which the communication device is to be connected based at least in part on the respective throughput values associated with the respective cells. For example, the distribution management component can determine the cell that has the highest throughput, as compared to the other throughputs of the other cells, and can select the cell that has the highest throughput as the most desirable cell to which the communication device is to be connected.

In other embodiments, the distribution management component can determine or facilitate determining which cell of the cells is the most desirable cell to which the communication device is to be connected based at least in part on the respective levels of resource utilization of the respective cells. For instance, the distribution management component can determine the respective levels of resource utilization of the respective cells based at least in part on the results of analyzing respective performance indicator information of the respective cells. The distribution management component also can determine respective signal conditions associated with the respective cells based at least in part on the results of analyzing the signal condition information regarding the respective signal conditions. Based at least in part on the analysis results, the distribution management component can determine which cell (e.g., a qualifying cell) has the smallest level of resource utilization, as compared to the other cells (e.g., other qualifying cells), and can select that cell as the best cell for connection with the communication device. In some implementations, the distribution management component can decide to consider only qualifying cells of the respective cells, wherein qualifying cells can be those cells that have signal conditions (e.g., signal qualities) that satisfy a minimum threshold signal condition (e.g., signal quality), and, from the qualifying cells, can determine and select the qualifying cell that has the smallest level of resource utilization.

In still other embodiments, the distribution management component can determine or facilitate determining which cell of the cells is the most desirable cell to which the communication device is to be connected based at least in part on the respective average number of communication devices connected to the respective cells. For instance, the distribution management component can determine the respective average number of communication devices connected to the respective cells based at least in part on the results of analyzing the respective performance indicator information of the respective cells. The distribution management component also can determine respective signal conditions associated with the respective cells based at least in part on the results of analyzing the signal condition information regarding the respective signal conditions. Based at least in part on the analysis results, the distribution management component can determine which cell (e.g., a qualifying cell) has the smallest average number of communication devices connected to it, as compared to the average communication device numbers of the other cells (e.g., other qualifying cells), and can select that cell as the best cell for connection with the communication device. In some implementations, the distribution management component can decide to consider only qualifying cells of the respective cells, wherein qualifying cells can be those cells that have signal conditions that satisfy a minimum threshold signal condition, and, from the qualifying cells, can determine and select the qualifying cell that has the smallest average number of communication devices connected to it relative to the average communication device numbers of the other qualifying cells.

At 810, a determination can be made regarding whether the source cell is the best cell for connection with the communication device. The distribution management component can determine whether the source cell is the best cell for connection with the communication device. For instance, the distribution management component can determine whether the cell that is determined to be the best cell, in accordance with the defined distribution management criteria, is the source cell or a different cell (e.g., target cell).

If it is determined that the source cell is the best cell, at 812, it can be determined that the communication device is to remain connected to the source cell, and the method 800 can terminate at this point. For instance, if the distribution management component determines that the source cell is the best cell, the distribution management component can determine that the communication device is to remain connected to the source cell.

However, if, at reference numeral 810, it is determined that the source cell is not the best cell, but rather the best cell is the target cell, the method 800 can proceed to reference numeral 814, and, at 814, a release message can be communicated to the communication device to redirect the communication device from the source cell to the target cell, wherein the release message can indicate that the connection between the communication device and the source cell is to be released, and wherein the release message can include target-cell information that can provide the communication device information regarding the target cell to which the communication device is to connect to facilitate connection of the communication device to the target cell. In response to the release message, the connection between the communication device and the source cell can be released, and the communication device can communicate a connection request to the target cell to request connecting to the target cell. At this point, the method 800 can end.

FIG. 9 depicts a flow chart of an example method 900 that can determine throughputs for a communication device with respect to cells to facilitate determining whether to redirect the communication device from a first cell to a second cell to facilitate controlling distribution of traffic and load balancing in a communication network, in accordance with various aspects and embodiments of the disclosed subject matter. The method 900 can be employed by, for example, a distribution management component of or associated with the communication network. In some embodiments, the distribution management component can be part of a RAN (e.g., C-RAN).

At 902, for each cell of a set of cells, the SINR for the communication device with respect to the cell can be determined based at least in part on the signal condition associated with the communication device and the cell, and an activity factor (e.g., subcarrier activity factor) of the cell. The distribution management component can receive signal condition information (e.g., signal quality information, signal strength information, . . . ) relating to the cells of the set of cells from the communication device, and can receive performance indicator information relating to performance indicators of the cells from the cells, wherein the performance indicators can include the activity factors and the bandwidths of the cells. For each cell of the set of cells that can be associated with the communication device, the distribution management component can determine (e.g., calculate) the SINR for the communication device with respect to the cell based at least in part on (e.g., as a function of) the signal condition (e.g., signal quality value (e.g., RSRQ value)) associated with the communication device and cell, and the activity factor (e.g., Q value) of the cell.

At 904, for each cell, the SINR for the communication device with respect to the cell can be mapped to a spectral efficiency for the communication device with respect to the cell based at least in part on field measurement data and/or validated simulation data. For each cell, the distribution management component can map the SINR for the communication device with respect to the cell to the spectral efficiency for the communication device with respect to the cell based at least in part on (e.g., as a function of) the field measurement data and/or the validated simulation data, as more fully described herein. The spectral efficiency (e.g., spectral efficiency value) can be expressed in bps/Hz, for example. In some embodiments, the distribution management component can determine the spectral efficiency for the communication device with respect to the cell, based at least in part on the SINR for the device with respect to the cell, using a theoretical conversion, such as, for example, Shannon's Theorem.

At 906, for each cell, the throughput for the communication device with respect to the cell can be determined based at least in part on the spectral efficiency for the communication device with respect to the cell, the bandwidth of the cell, and/or the activity factor of the cell. For each cell, the distribution management component can determine (e.g., calculate) the throughput for the communication device with respect to the cell based at least in part on (e.g., as a function of) the spectral efficiency for the communication device with respect to the cell, the bandwidth of the cell, and/or the activity factor of the cell.

In some embodiments, the distribution management component can use the respective throughputs (e.g., throughput values) of the respective cells to determine which of the cells is the best cell for the communication device to be connected to in order to enhance performance of the communication device (e.g., enhance throughput of the communication device) and user experience of the communication device user and/or enhance performance of the communication network, as more fully disclosed herein. The best cell can be a target cell that can be different from the source cell to which the device initially can be connected or can be the source cell, depending in part on the respective throughput values and/or other factors (e.g., other defined distribution management criteria) associated with the source cell and the target cell. For example, the distribution management component can determine that the cell associated with the best (e.g., highest) throughput value is the best cell.

Figure 10:
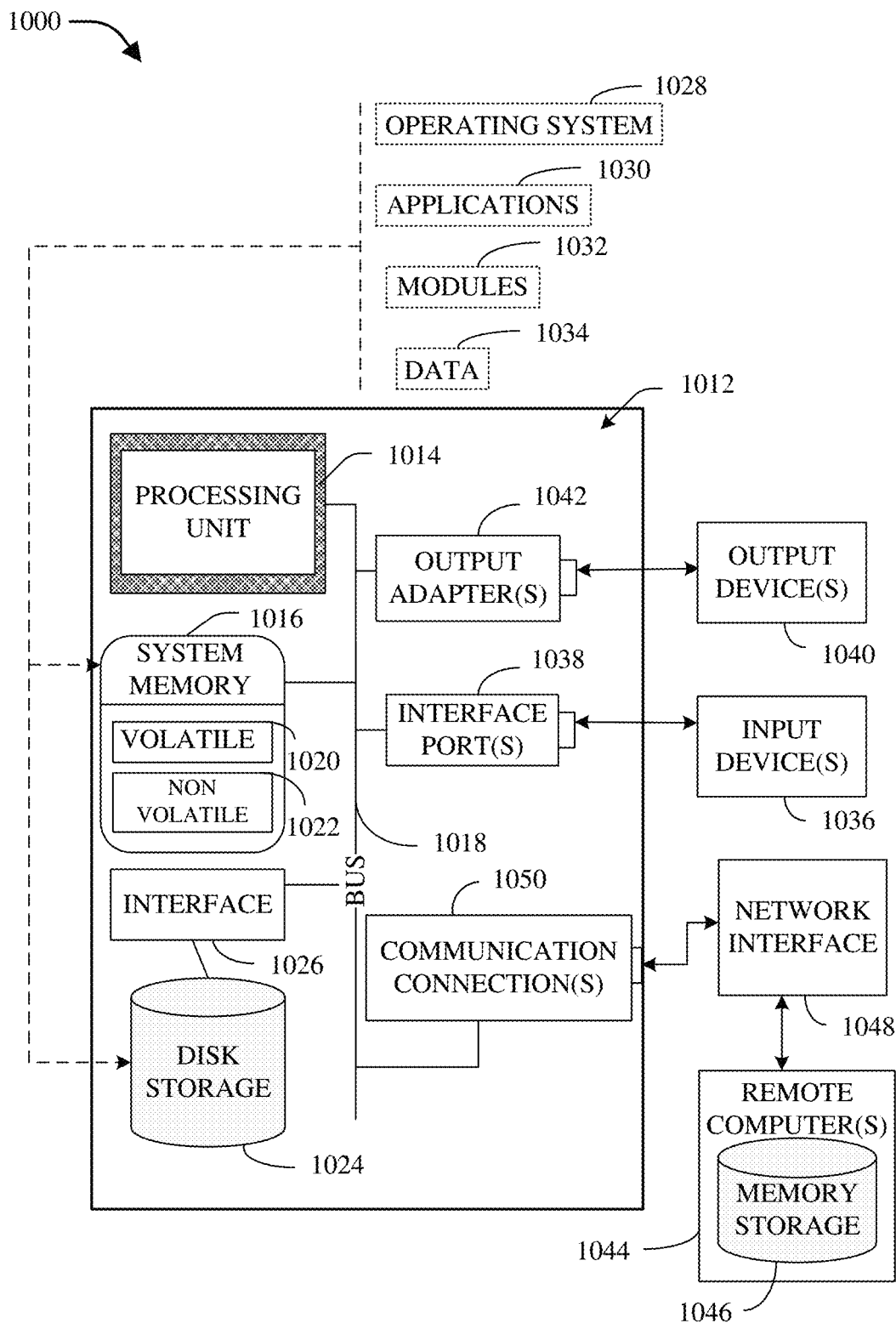
FIG. 10 is a schematic block diagram illustrating a suitable operating environment.
Figure 11:
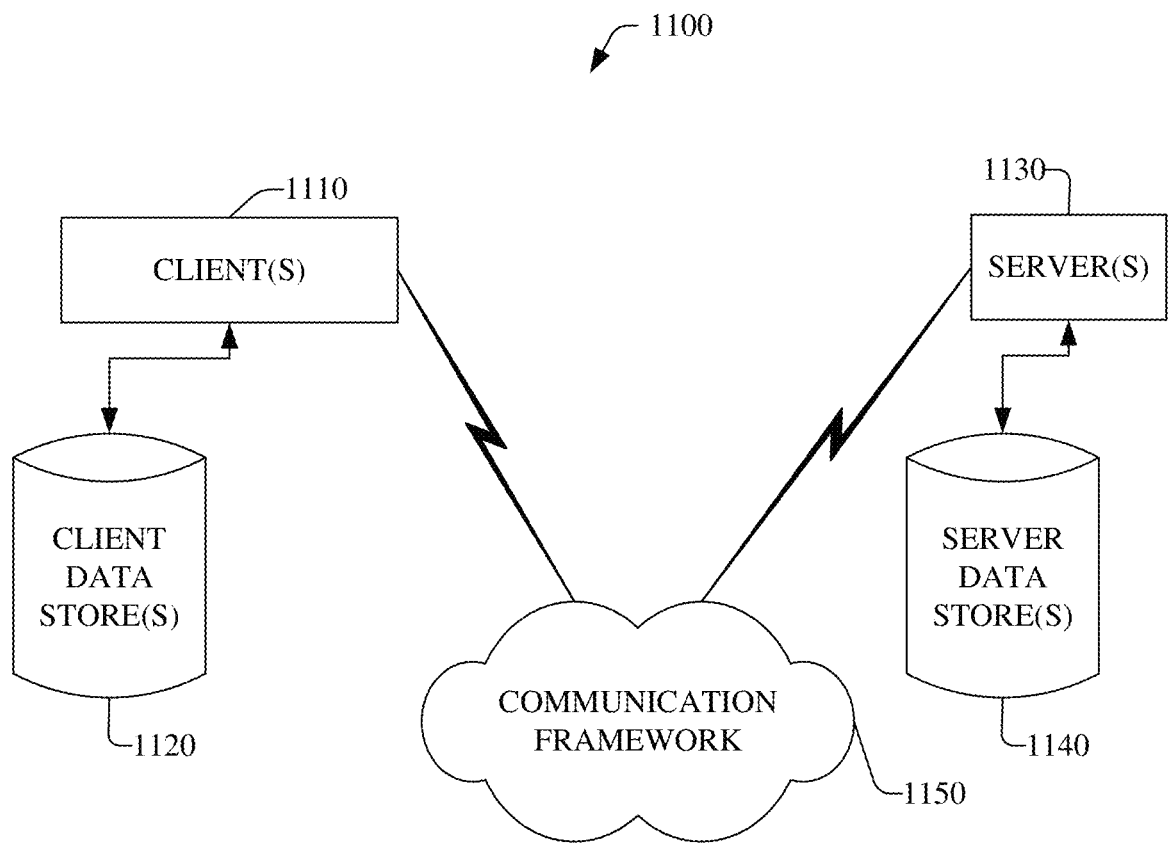
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., mobile phone, electronic tablets or pads, laptop computers, PDAs, . . . ), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 10, a suitable environment 1000 for implementing various aspects of this disclosure includes a computer 1012. The computer 1012 includes a processing unit 1014, a system memory 1016, and a system bus 1018. It is to be appreciated that the computer 1012 can be used in connection with implementing one or more of the systems, components, or methods shown and described in connection with FIGS. 1-8, or otherwise described herein. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

FIG. 10 also depicts software that acts as an intermediary between users and the basic computer resources described in the suitable operating environment 1000. Such software includes, for example, an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored, e.g., in system memory 1016 or on disk storage 1024. It is to be appreciated that this disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 (e.g., computing system) with which the subject matter of this disclosure can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing this disclosure, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client(s) 1110 are operatively connected to one or more client data store(s) 1120 that can be employed to store information local to the client(s) 1110. Similarly, the server(s) 1130 are operatively connected to one or more server data store(s) 1140 that can be employed to store information local to the servers 1130.

It is to be noted that aspects, features, and/or advantages of the disclosed subject matter can be exploited in substantially any wireless telecommunication or radio technology, e.g., Wi-Fi; Gi-Fi; Hi-Fi; Bluetooth; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or nonvolatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, radio access network, base station, cell, sector, communication network, distribution management component, processor component, data store, cloud network component, . . . ), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
analyzing, by a system comprising a processor, signal quality information and performance indicator information, wherein the signal quality information is received, from a device, with and as part of a radio resource control connection request to request a first connection of the device to a first cell device of respective cell devices, comprising the first cell device and a second cell device, wherein the signal quality information relates to respective signal qualities between the device and the respective cell devices, wherein the respective signal qualities comprise a first signal quality between the device and the first cell device and a second signal quality between the device and the second cell device, and wherein the performance indicator information relates to respective performance indicators of the respective cell devices and comprises respective activity factors and respective bandwidth parameters associated with the respective cell devices;

determining, by the system, a first throughput parameter associated with the first cell device and a second throughput parameter associated with the second cell device based on a first result of the analyzing of the signal quality information and the performance indicator information;

determining, by the system, whether the first signal quality between the device and the first cell device and the second signal quality between the device and the second cell device satisfy a defined threshold signal quality based on a second result of the analyzing of the signal quality information; and based on the first throughput parameter and the second throughput parameter, and based on a third result of the determining of whether the first signal quality and the second signal quality satisfy the defined threshold signal quality, determining, by the system, whether to redirect the device from the first cell device to the second cell device for a second connection of the device to the second cell device.

2. The method of claim 1, further comprising:
receiving, by the system, the radio resource control connection request, comprising the signal quality information, from the device, wherein, while the device was in an idle mode, the device performed respective inter-frequency measurements of the respective signal qualities between the device and the respective cell devices to generate the signal quality information, and communicated the radio resource control connection request to the system; and
receiving, by the system, the performance indicator information from the respective cell devices.

3. The method of claim 1, further comprising:
in response to the radio resource control connection request, establishing, by the system, the first connection between the device and the first cell device; and
receiving, by the system, additional signal quality information from the device, wherein the additional signal quality information relates to the respective signal qualities between the device and the respective cell devices, and wherein the analyzing comprises analyzing the signal quality information, the additional signal quality information, and the performance indicator information to facilitate determining the first result, the second result, or the third result.

4. The method of claim 1, wherein the signal quality information comprises first signal quality information that indicates the first signal quality between the device and the first cell device and second quality information that indicates the second signal quality between the device and the second cell device, wherein the performance indicator information comprises a first activity factor associated with the first cell device and a second activity factor associated with the second cell device, and wherein the method further comprises:
determining, by the system, a first signal-to-interference-and-noise ratio value associated with the first cell device as a first function of the first signal quality information and the first activity factor; and
determining, by the system, a second signal-to-interference-and-noise ratio value associated with the second cell device as a second function of the second signal quality information and the second activity factor.

5. The method of claim 4, further comprising:
determining, by the system, a first spectral efficiency between the device and the first cell device based on a first signal-to-interference-and-noise ratio value associated with the device and the first cell device, and based on a portion of a group of information comprising field measurement information and validated simulation information, wherein the group of information relates to spectral efficiencies and signal-to-interference-and-noise ratio values; and
determining, by the system, a second spectral efficiency between the device and the second cell device based on a second signal-to-interference-and-noise ratio value associated with the device and the second cell device, and based on the portion of the group of information.

6. The method of claim 1, wherein the performance indicator information comprises a first activity factor and a first bandwidth parameter associated with the first cell device and a second activity factor and a second bandwidth parameter associated with the second cell device, and wherein the determining of the first throughput parameter associated with the first cell device and the second throughput parameter associated with the second cell device further comprises:
determining the first throughput parameter associated with the first cell device as a function of the first bandwidth, the first activity factor, and a first spectral efficiency associated with the first cell device; and
determining the second throughput parameter associated with the second cell device as a function of the second bandwidth, the second activity factor, and a second spectral efficiency associated with the second cell device.

7. The method of claim 6, wherein the defined threshold signal quality is a defined minimum threshold signal quality, and wherein the method further comprises:
determining, by the system, that the first signal quality and the second signal quality each satisfy the defined minimum threshold signal quality based on the second result of the analyzing of the signal quality information;
determining, by the system, that the second throughput parameter is higher than the first throughput parameter based on a comparison result of comparing the first throughput parameter and the second throughput parameter; and
in response to the determining that the first signal quality and the second signal quality each satisfy the defined minimum threshold signal quality, and in response to the determining that the second throughput parameter is higher than the first throughput parameter, determining, by the system, that the device is to be redirected from the first cell device to the second cell device.

8. The method of claim 1, wherein the determining whether to redirect the device from the first cell device to the second cell device comprises determining whether to redirect the device from the first cell device to the second cell device for the second connection of the device to the second cell device based on a defined load balancing criterion, and wherein the defined load balancing criterion is selected from defined load balancing criteria that comprise a highest throughput parameter associated with the device with respect to a cell device of the respective cell devices, a smallest amount of resource utilization associated with the cell device, and a smallest average number of devices associated with the cell device.

9. The method of claim 1, further comprising:
in response to determining that the device is to be redirected from the first cell device to the second cell device, releasing, by the system, the first connection of the device to the first cell device; and
communicating, by the system, connection information to the device to facilitate establishing the second connection of the device to the second cell device, wherein the connection information comprises redirection information that indicates that the device is to be redirected from the first cell device to the second cell device and cell-related information regarding the second cell device.

10. The method of claim 1, wherein the first cell device is associated with a first cell site and the second cell device is associated with a second cell site.

11. The method of claim 1, wherein the first cell device is associated with a first bandwidth parameter and the second cell device is associated with a second bandwidth parameter, and wherein the first cell device and the second cell device are associated with a same cell site.

12. A system, comprising:
a processor; and
a memory that stores executable instructions that, when executed by the processor, facilitate performance of operations, comprising:
analyzing signal condition data and performance indicator data, wherein a radio resource control connection request, comprising the signal condition data is received from a device to request a first connection of the device to a source cell device of respective cell devices, comprising the source cell device and a potential target cell device, wherein the signal condition data relates to respective signal conditions between the device and the respective cell devices, wherein the respective signal conditions comprise a first signal condition between the device and the source cell device and a second signal condition between the device and the potential target cell device, and wherein the performance indicator data relates to respective performance indicators of the respective cell devices and comprises respective activity factors and respective bandwidth values associated with the respective cell devices;
determining a first throughput value associated with the source cell device and a second throughput value associated with the potential target cell device based on a first result of the analyzing of the signal condition data and the performance indicator data;
determining whether the first signal condition and the second signal condition satisfy a defined threshold signal condition based on a second result of the analyzing of the signal condition data; and
based on the first throughput value and the second throughput value, and based on a third result of the determining of whether the first signal condition and the second signal condition satisfy the defined threshold signal condition, determining whether to redirect the device from the source cell device to the potential target cell device for a second connection of the device to the potential target cell device.

13. The system of claim 12, wherein the operations comprise:
receiving the radio resource control connection request, comprising the signal condition data, from the device, wherein the device is in an idle mode; and
receiving a portion of the performance indicator data from at least one of the respective cell devices, wherein the portion of the performance indicator data is obtained by a radio access network device of a cloud computing environment.

14. The system of claim 12, wherein the signal condition data is first signal condition data, and wherein the operations comprise:
in response to the radio resource control connection request, establishing the first connection between the device and the source cell device; and
receiving second signal condition data from the device, wherein the second signal condition data relates to the respective signal conditions between the device and the respective cell devices, and wherein the analyzing comprises analyzing the first signal condition data, the second signal condition data, and the performance indicator data to facilitate determining the first result, the second result, or the third result.

15. The system of claim 12, wherein the signal condition data comprises first signal condition data that indicates the first signal condition between the device and the source cell device and second signal condition data that indicates the second signal condition between the device and the potential target cell device, wherein the performance indicator data comprises a first activity factor associated with the source cell device and a second activity factor associated with the potential target cell device, and wherein the operations further comprise:
determining a first signal-to-interference-and-noise ratio value associated with the source cell device as a first function of the first signal condition data and the first activity factor; and
determining a second signal-to-interference-and-noise ratio value associated with the potential target cell device as a second function of the second signal condition data and the second activity factor.

16. The system of claim 15, wherein the operations comprise:
determining a first spectral efficiency value between the device and the source cell device based on a first signal-to-interference-and-noise ratio value associated with the device and the source cell device, and based on at least one of field measurement data or validated simulation data, wherein at least one of the field measurement data or the validated simulation data relates to spectral efficiency values and signal-to-interference-and-noise ratio values; and
determining a second spectral efficiency value between the device and the potential target cell device based on a second signal-to-interference-and-noise ratio value associated with the device and the potential target cell device, and based on at least one of the field measurement data or the validated simulation data.

17. The system of claim 12, wherein the performance indicator data comprises a first activity factor and a first bandwidth value associated with the source cell device and a second activity factor and a second bandwidth value associated with the potential target cell device, and wherein the determining of the first throughput value associated with the source cell device and the second throughput value associated with the potential target cell device further comprises:
determining the first throughput value associated with the source cell device as a first function of the first bandwidth value, the first activity factor, and a first spectral efficiency value associated with the source cell device; and determining the second throughput value associated with the potential target cell device as a second function of the second bandwidth value, the second activity factor, and a second spectral efficiency value associated with the potential target cell device.

18. The system of claim 17, wherein the operations comprise:

determining that the first signal condition and the second signal condition each satisfy the defined threshold signal condition based on the second result of the analyzing of the signal condition data;

determining that the second throughput value is greater than the first throughput value based on a comparison result of comparing the first throughput value and the second throughput value;

in response to the determining that the first signal condition and the second signal condition each satisfy the defined threshold signal condition, and in response to the determining that the second throughput value is greater than the first throughput value, determining that the device is to be redirected from the source cell device to the potential target cell device determined to be a target cell device;

in response to determining that the device is to be redirected from the source cell device to the target cell device, releasing an initial connection between the device and the source cell device; and communicating connection data to the device to facilitate establishing the second connection of the device to the target cell device, wherein the connection data comprises redirection data that indicates that the device is to be redirected from the source cell device to the target cell device and target cell-related data regarding the target cell device.

19. A non-transitory machine-readable medium, comprising executable instructions that, when executed by a processor, facilitate performance of operations, comprising:

analyzing signal condition data and performance indicator data, wherein the signal condition data is received, from a device while in an idle mode, as part of a radio resource control connection request to request a first connection of the device to a first cell device of respective cell devices, comprising the first cell device and a second cell device, wherein the signal condition data relates to respective signal conditions between the device and the respective cell devices, wherein the respective signal conditions comprise a first signal condition between the device and the first cell device and a second signal condition between the device and the second cell device, and wherein the performance indicator data relates to respective performance indicators of the respective cell devices and comprises respective activity factors and respective bandwidth parameters associated with the respective cell devices;

determining a first throughput parameter associated with the first cell device and a second throughput parameter associated with the second cell device based on a first result of the analyzing of the signal condition data and the performance indicator data;

determining whether the first signal condition and the second signal condition satisfy a defined threshold signal condition based on a second result of the analyzing of the signal condition data; and based on the first throughput parameter and the second throughput parameter, and based on a third result of the determining of whether the first signal condition and the second signal condition satisfy the defined threshold signal condition, determining whether to redirect the device from the first cell device to the second cell device for a second connection of the device to the second cell device.

20. The non-transitory machine-readable medium of claim 19, wherein the operations further comprise:

receiving the radio resource control connection request, comprising the signal condition data, from the device, wherein the device is in the idle mode; and receiving at least a portion of the performance indicator data from at least some of the respective cell devices.

* * * * *